US007230065B2

(12) United States Patent
Hale et al.

(10) Patent No.: US 7,230,065 B2
(45) Date of Patent: Jun. 12, 2007

(54) BLENDS OF POLYCARBONATE AND SULFONE COPOLYESTERS

(75) Inventors: Wesley Raymond Hale, Kingsport, TN (US); Sam Richard Turner, Blacksburg, VA (US); Gary Wayne Connell, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 45 days.

(21) Appl. No.: 11/179,406

(22) Filed: Jul. 12, 2005

(65) Prior Publication Data

US 2007/0015882 A1 Jan. 18, 2007

(51) Int. Cl.
*C08G 63/00* (2006.01)
(52) U.S. Cl. ............... 528/271; 422/411.1; 422/412; 525/67; 525/68; 525/69
(58) Field of Classification Search ............. 422/411.1, 422/412; 525/67, 68, 69, 166.437, 439; 528/271, 528/272
See application file for complete search history.

(56) References Cited

U.S. PATENT DOCUMENTS

| | | | |
|---|---|---|---|
| 3,030,335 A | 4/1962 | Goldberg | |
| 3,317,466 A | 5/1967 | Caldwell et al. | |
| 3,541,059 A | 11/1970 | Schaper | |
| RE27,682 E | 6/1973 | Schnell et al. | |
| 3,799,953 A | 3/1974 | Freitag et al. | |
| 3,907,754 A | 9/1975 | Tershany et al. | |
| 3,962,189 A | 6/1976 | Russin et al. | |
| 4,001,184 A | 1/1977 | Scott | |
| 4,001,884 A | 1/1977 | Herbst et al. | |
| 4,010,145 A | 3/1977 | Russin et al. | |
| 4,185,009 A | 1/1980 | Idel et al. | |
| 4,356,229 A | 10/1982 | Brodnyan et al. | |
| 4,367,186 A | 1/1983 | Adelmann et al. | |
| 4,431,793 A | 2/1984 | Rosenquist | |
| 4,452,933 A | 6/1984 | McCready | |
| 4,469,861 A | 9/1984 | Mark et al. | |
| 4,749,773 A | 6/1988 | Weaver et al. | |
| 4,826,903 A | 5/1989 | Weaver et al. | |
| 4,845,188 A | 7/1989 | Weaver et al. | |
| 4,882,412 A | 11/1989 | Weaver et al. | |
| 4,892,922 A | 1/1990 | Weaver et al. | |
| 4,892,923 A | 1/1990 | Weaver et al. | |
| 5,017,680 A | 5/1991 | Sublett | |
| 5,142,088 A | 8/1992 | Phelps et al. | |
| 5,191,038 A | 3/1993 | Krabbenhoft et al. | |
| 5,290,631 A | 3/1994 | Fleury et al. | |
| 5,489,665 A | 2/1996 | Yamato et al. | |
| 5,494,992 A | 2/1996 | Kanno et al. | |
| 5,498,688 A | 3/1996 | Oshino et al. | |
| 5,654,347 A | 8/1997 | Khemani et al. | |
| 5,668,243 A | 9/1997 | Yau et al. | |
| 5,681,918 A | 10/1997 | Adams et al. | |
| 5,696,176 A | 12/1997 | Khemani et al. | |
| 5,907,026 A | 5/1999 | Factor et al. | |
| 6,120,889 A | 9/2000 | Turner et al. | |
| 6,225,436 B1 | 5/2001 | Eiffler et al. | |
| 6,287,656 B1 | 9/2001 | Turner et al. | |
| 6,307,006 B1 | 10/2001 | Koenig et al. | |
| 6,323,304 B1 | 11/2001 | Lemmon et al. | |
| 6,448,334 B1 | 9/2002 | Verhoogt et al. | |
| 6,504,002 B1 | 1/2003 | Karlik et al. | |
| 2004/0138388 A1* | 7/2004 | Pecorini et al. | ............. 525/439 |

FOREIGN PATENT DOCUMENTS

| | | |
|---|---|---|
| DE | 19727709 | 1/1999 |
| EP | 273 144 | 5/1987 |
| JP | 09059371 | 4/1997 |

OTHER PUBLICATIONS

"Polymer Blends", 2000, vol. 1, Chapters 2, 9, 10, 11 and 17 and vol. 2, Chapters 23 and 28, edited by D. R. Paul and C. B. Bucknall, John Wiley & Sons, Inc.
"Plastic Additives Handbook 5$^{th}$ Edition", 2001, pp. 98-108, pp. 109-112, Hanser Gardner Publications, Inc., Cincinnati, OH.
Colman et al., "Polymer 31" 1187 (1990).
Sears, J. Kern and Darby, Joseph R., "The Technology of Plasticizers", 1982, pp. 136-137, published by Society of Plastic Engineers/Wiley and Sons, New York.
"Mixing and Compounding of Polymers" 1994, Chapters 1-5 and 18-23, I. Manas-Zloczower & Z. Tadmor editors, Carl Hanser Verlag Publisher, New York.

* cited by examiner

*Primary Examiner*—Terressa Boykin
(74) *Attorney, Agent, or Firm*—B. J. Boshears; Bernard J. Graves, Jr.

(57) ABSTRACT

The present invention relates to miscible blends of the polycarbonate of bisphenol A and polyesters from aromatic dicarboxylic acids, 1,4-cyclohexanedimethanol, ethylene glycol, and 2,2'-(sulfonylbis(4,1-phenyleneoxy)-bis(ethanol).

52 Claims, No Drawings

BLENDS OF POLYCARBONATE AND
SULFONE COPOLYESTERS

FIELD OF THE INVENTION

The present invention relates to miscible blends of the polycarbonates of bisphenol A and polyesters from aromatic dicarboxylic acids, 1,4-cyclohexanedimethanol, ethylene glycol, and 2,2'-(sulfonylbis(4,1-phenyleneoxy)-bis(ethanol).

BACKGROUND OF INVENTION

The polycarbonate of 4,4'-isopropylidenediphenol (bisphenol A polycarbonate) is a well known engineering molding plastic. Bisphenol A polycarbonate is a clear high-performance plastic having good physical properties such as dimensional stability, high heat resistance, and good impact strength. Although bisphenol-A polycarbonate has many good physical properties, its relatively high melt viscosity leads to poor melt processability and the polycarbonate exhibits poor chemical resistance.

Blends display different physical properties based upon the nature of the polymers blended together as well as the concentration of each polymer in the blend. Attempts have been made to blend bisphenol-A polycarbonate with other polymers that have good chemical resistance, processability, and machinability. These attempts to improve melt processability, chemical resistance and other physical properties of bisphenol-A polycarbonate have been made by blending bisphenol A polycarbonate with polymers such as polystyrene, elastomers, polyesters, and polyesterimides. However, blends of bisphenol-A polycarbonate with other polymeric materials have usually resulted in immiscible blend compositions. Immiscible blend compositions are inadequate for many uses because they are not clear.

Clear, miscible blends of any two polymers are rare. Differential scanning calorimetry testing detects only a single glass transition temperature (Tg) for miscible blends composed of two or more components.

There is a need in the art for visually clear or miscible, two-phase blends, which are particularly useful in applications requiring improved chemical resistance and melt processability.

SUMMARY OF THE INVENTION

This invention relates to miscible blends of polycarbonates of bisphenol A and polyesters from aromatic dicarboxylic acids, 1,4-cyclohexanedimethanol, ethylene glycol, and 2,2'-(sulfonylbis(4,1-phenyleneoxy))-bis(ethanol).

More particularly, in a first embodiment, this invention relates to a polymer composition comprising:

(A) from 1 to 99 percent by weight at least one polyester (A) comprising:
(1) diacid residues comprising from about 80 to 100 mole percent diacid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and
(2) diol residues comprising from about 50 to 65 mole percent 1,4-cyclohexanedimethanol residues, from about 1 to about 49 mole percent of ethylene glycol residues, from about 1 to 35 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and (B) from 1 to 99 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent;

wherein the total weight percent of polyester(s) (A) and polycarbonate(s) (B) is equal to 100 weight percent; and wherein polyester(s) (A) and polycarbonate(s) (B) are miscible when blended together.

A second embodiment of the present invention is a polymer composition comprises:

(A) from 20 to 99 percent by weight at least one polyester (A) comprising:
(1) diacid residues comprising from about 90 to 100 mole percent phthalic acid residues selected from the group consisting of terephthalic acid residues, isophthalic acid residues, and mixtures thereof; and from about 0 to about 20 mole percent of modifying dicarboxylic acid residues having about 2 to 20 carbon atoms, wherein the total mole percent of diacid residues is equal to 100 mole percent; and
(2) diol residues comprising from about 55 to 65 mole percent 1,4-cyclohexanedimethanol residues, from about 15 to 40 mole percent of ethylene glycol residues, from about 5 to 25 mole percent 2,2'-(sulfonylbis(4,1-phenyleneoxy)-bis(ethanol) and from about 0 to 10 mole percent modifying diol residuests having from 3 to 16 carbon atoms, wherein the total mole percent of diol residues is equal to 100 mole percent;

(B) from 1 to 80 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and (C) optionally, at least one salt (C) prepared by the reaction of one or more acidic phosphorus-containing compounds with one or more basic organic compounds which contain nitrogen;

wherein the total weight percent of polyester(s) (A) and polcarbonate(s) (B) is equal to 100 weight percent; and wherein polyester(s) (A) and polycarbonate(s) (B) are miscible when blended together.

A third embodiment of the present invention relates to a polymer composition comprising:

(A) from 40 to 90 percent by weight at least one polyester (A) comprising:
(1) diacid residues comprising from about 90 to 100 mole percent diacid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and
(2) diol residues comprising from about 58 to 64 mole percent 1,4-cyclohexanedimethanol residues, from about 20 to 40 mole percent of ethylene glycol residues, from about 10 to 20 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and (B) from 10 to 60 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and (C) optionally, at least one salt (C) prepared by the reaction of one or more acidic phosphorus-containing compounds with one or more basic organic compounds which contain nitrogen;

wherein the total weight percent of polyester(s) (A) and polycarbonate(s) (B) is equal to 100 weight percent; and wherein polyester(s) (A) and polycarbonate(s) (B) are miscible when blended together.

A fourth embodiment of the present invention relates to a polymer composition comprising:

(A) from 50 to 80 percent by weight at least one polyester (A) comprising:

(1) diacid residues comprising from about 90 to 100 mole percent diacid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and (2) diol residues comprising from about 58 to 64 mole percent 1,4-cyclohexanedimethanol residues, from about 20 to 40 mole percent of ethylene glycol residues, from about 8 to 15 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and (B) from 20 to 50 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and (C) optionally, at least one salt (C) prepared by the reaction of one or more acidic phosphorus-containing compounds with one or more basic organic compounds which contain nitrogen;

wherein the total weight percent of polyester(s) (A) and polycarbonate(s) (B) is equal to 100 weight percent; and wherein polyester(s) (A) and polycarbonate(s) (B) are miscible when blended together.

A fifth embodiment of the present invention relates to a polymer composition comprising:

(A) from 60 to 75 percent by weight at least one polyester (A) comprising:

(1) diacid residues comprising from about 90 to 100 mole percent diacid acid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and (2) diol residues comprising from about 58 to 64 mole percent 1,4-cyclohexanedimethanol residues, from about 20 to 40 mole percent of ethylene glycol residues, from about 8 to 15 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and (B) from 25 to 40 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and (C) optionally, at least one salt (C) prepared by the reaction of one or more acidic phosphorus-containing compounds with one or more basic organic compounds which contain nitrogen;

wherein the total weight percent of said polyester(s) (A) and polycarbonate(s) (B) is equal to 100 weight percent; and wherein polyester(s) (A) and polycarbonate(s) (B) are miscible when blended together.

In all of the embodiments of the invention, the polymer compositions of the invention may optionally, comprise at least one salt (C) prepared from the reaction of one or more acidic phosphorus-containing compounds and one or more basic organic compounds which contain nitrogen.

Also, in all of the embodiments of the invention, polyester(s) (A) and polycarbonate(s) (B) of the polymer composition of the invention have refractive indices which differ in absolute value by 0.008 or less, preferably, 0.006 or less, more preferably, 0.004 or less.

A sixth embodiment of the invention relates to a method for producing the polymer composition of the invention comprising the steps of:

(a) blending polyester(s) (A) and polycarbonate)(s) (B) and optionally, salt (C), to form the second component;

(b) before, during or after the blending of polyester(s) (A) and polycarbonate(s) (B), melting polyester(s) (A) and polycarbonate(s) (B) to form after the blending and melting, a melt blend; and (c) cooling the melt blend to form a clear blend composition.

A seventh embodiment of the invention relates to a method for producing the polymer composition of the invention comprising the steps of:

(a) blending polyester(s) (A), polycarbonate(s) (B), and optionally, salt(s) (C);

(b) melting the blend of (a) to form after the blending and melting, a melt blend; and (d) cooling the melt blend to form a clear blend composition.

An eighth embodiment of the invention relates to a process for the manufacture of film or sheet comprising the steps of extruding or calendering the polymer compositions of the invention. The film or sheet produced from this process have at least one layer but can have two or more layers. Polyester(s) (A) and polycarbonate(s) (B) of the invention may be present in the film or sheet in separate layers.

The invention also includes molded or formed articles, film, sheet, and/or fibers comprising the polymer compositions of the invention which may be formed by any conventional method known in the art as well as a process for making such articles, film, sheet, and/or fibers comprising the steps of injection molding, extrusion blow molding, film/sheet extruding or calendering the polymer compositions.

These polyester blends do have improved chemical resistance and melt processability, when compared to unblended bisphenol-A polycarbonate. Such blend would be especially suitable for the manufacture of clear molded articles, fibers, sheeting, and film.

DETAILED DESCRIPTION OF THE INVENTION

This invention encompasses miscible compositions of certain polyesters from diacid residues selected from the group consisting of terephthalic acid, isophthalic acid, or mixtures thereof, diol residues selected from alkylene glycol residues with miscible blends of polycarbonates of bisphenol A with polyesters from 1,4-cyclohexanedicarboxylic acid, and 1,4-cyclohexanedimethanol. Surprisingly, the present invention provides polymer blends exhibit an improved combination of at least two properties such as clarity and miscibility as well as good dimensional stability, good high heat resistance and good Izod impact strength.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. The term "residue", as used herein, means any organic structure incorporated into a polymer or plasticizer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

This invention relates to polymer composition(s) comprising bisphenol-A polycarbonate(s) and particular polyesters from aromatic dicarboxylic acids, 1,4-cyclohexanedimethanol, ethylene glycol, and 2,2'-(sulfonylbis(4,1-phenyleneoxy)-bis(ethanol).

In one embodiment, this invention relates to a polymer composition comprising:

(A) from 1 to 99 percent by weight at least one polyester (A) comprising:

(1) diacid residues comprising from about 80 to 100 mole percent diacid residues selected from the group consisting of terephthalic acid residues, isophthalic acid residues, and mixtures thereof; and from about 0 to about 20 mole percent of modifying diacid residues having about 2 to 20 carbon atoms; and (2) diol residues comprising from about 50 to 65 mole percent 1,4-cyclohexanedimethanol residues, from about 1 to about 49 mole percent of ethylene glycol residues, from about 1 to 35 mole percent 2,2'-(sulfonylbis(4,1-phenyleneoxy)-bis(ethanol) and from about 0 to 10 mole percent modifying diol residues having from 3 to 16 carbon atoms; and (B) from 1 to 99 percent by weight of at least one polycarbonate (B) comprising from about 90 to 100 mole percent 4,4'-isopropylidenediphenol and from about 0 to 10 mole percent modifying diol residues having 2 to 16 carbon atoms;

wherein the total weight percent of polyester(s) (A) and polycarbonate(s) (B) is equal to 100 weight percent; and wherein polyester(s) (A) and polycarbonate(s) (B) are miscible when blended together.

The polyester(s) (A) included in the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 20 mole % isophthalic acid, based on the total acid residues, means the polyester contains 20 mole % isophthalic acid residues out of a total of 100 mole % acid residues. Thus, there are 20 moles of isophthalic acid residues among every 100 moles of acid residues. In another example, a polyester containing 10 mole % ethylene glycol, based on the total diol residues, means the polyester contains 10 mole % ethylene glycol residues out of a total of 100 mole % diol residues. Thus, there are 10 moles of ethylene glycol residues among every 100 moles of diol residues.

For the polyester compositions of the invention, the total weight percent for polyester(s) (A) and polycarbonate(s) (B) is equal to 100 weight percent.

The polymer compositions of the invention comprise polyester(s) and polycarbonate(s) (B) that are miscible. The term "miscible" as used herein, is intended to mean that the blend has a single, homogeneous amorphous phase as indicated by a single composition-dependent Tg (glass transition temperature) as measured by well-known techniques such as, for example, differential scanning calorimetry ("DSC"). By contrast, the term "immiscible", as used herein, denotes a blend that shows at least 2 phases and exhibits more than one Tg. A further general description of miscible and immiscible polymer blends and the various analytical techniques for their characterization may be found in *Polymer Blends*, Volumes 1 and 2, Edited by D. R. Paul and C. B. Bucknall, 2000, John Wiley & Sons, Inc. The desired crystallization kinetics from the melt also may be achieved by the addition of polymeric additives such as, for example, plasticizers, or by altering the molecular weight characteristics of the polymer. Polyesters (A) typically have an inherent viscosity (I.V.) of about 0.3 to 1.2 dL/g, preferably about 0.6 to 1.1 dL/g. For polyester (A), one embodiment of the invention is a polyester having an inherent viscosity of at least 0.3 dL/g. In another embodiment, polyester (A) preferably has an inherent viscosity of at least 0.6 dL/g. As used herein, I.V. refers to inherent viscosity determinations made at 25° C. using 0.50 gram of polymer per 100 mL of a solvent composed of 60 weight percent phenol and 40 weight percent tetrachloroethane. The basic method of determining the I.V. of the polyesters herein is set forth in ASTM method D2857-95.

The diacids useful in the first component of the invention, polyester (A) of the present invention may comprise from about 80 to 100 mole percent, more preferably, 90 to 100 mole percent of diacid residues, for example, terephthalic acid residues, isophthalic acids, and/or mixtures thereof. Terephthalic acid is a preferred embodiment. For example, the polyester may comprise about 80 to about 100 mole % of diacid residues from terephthalic acid and 0 to about 20 mole % diacid residues from isophthalic acid (in one embodiment, about 0.1 to 20 mole percent isophthalic acid). In another example, the polyester may comprise about 80 to about 99.9 mole % of diacid residues from terephthalic acid and 0.1 to about 20 mole % diacid residues from isophthalic acid.

Polyester (A) of the first component of the compositions of the invention also may further comprise from about 0 to about 20 mole percent, and preferably 0 to 10 mole percent of the residues of one or more modifying dicarboxylic acids (referred to herein as "diacids", but not including terephthalic acid residues or isophthalic acid residues). The modifying acids have about 2 to 20 carbon atoms. Suitable examples of modifying diacids for polyester (A) that may be used include but are not limited to aliphatic dicarboxylic acids, alicyclic dicarboxylic acids, aromatic dicarboxylc acids (other than terephthalic acid and isophthalic acid), or mixtures of two or more of these acids. Specific examples of modifying dicarboxylic acids include, but are not limited to, 4,4'-biphenyldicarboxylic acid, 1,4-, 1,5-, 2,6-, 2,7-naphthalenedicarboxylic acid, 4,4'-oxybenzoic, trans-4,4'-stilbenedicarboxylic acid, or mixtures thereof. Suitable examples of modifying aliphatic diacids are those containing 2 to 12 carbon atoms, such as oxalic, malonic, succinic, glutaric, adipic, pimelic, suberic, azelaic, and sebacic acids, or mixtures thereof.

The dicarboxylic acid component of the polyester portion of the present blend can be derived from dicarboxylic acids, their corresponding esters, or mixtures thereof. Examples of esters of the dicarboxylic acids useful in the present invention include the dimethyl, dipropyl, diisopropyl, dibutyl, and diphenyl esters, and the like.

Polyester(s) (A) of the polymer compositions of the invention also comprises diol residues that may comprise about 50 to about 65 mole percent of the residues of 1,4-cyclohexanedimethanol (CHDM), 1 to 35 mole percent of the residues of 2,2'-(sulfonylbis(4,1-phenyeneoxy)-bis (ethanol) (BDS), 0 to about 49 mole percent ethylene glycol (EG) and from 0 to 10 mole percent of other modifying glycol residues containing about 3 to 16 carbon atoms. The relationship between minimum required amounts of CHDM, BDS, and EG glycol components in Polyester (A) for miscibility with polycarbonate can be related by the equation: Mole Percent CHDM=0.60×Mole Percent BDS+0.49 where the amount of the third monomer, EG, is 1−Mole Percent CHDM−Mole Percent BDS. As used herein, the term "diol" is synonymous with the term "glycol" and means any dihydric alcohol. In one embodiment, the modifying diols for polyester (A) have from 3 to 16 carbon atoms. For example, in polyester (A), the diol residues may comprise about: (a) 55 to 65 mole percent, and preferably, about 58 to 64 mole percent of the residues of 1,4-cyclohexanedimethanol, based on the total mole percentage of diol residues equaling 100 mole percent, (b) 1 to 49 mole percent, preferably, about 15 to 40 mole percent, more preferably, about 20 to 40 mole percent of the residues of ethylene glycol residues, and (c) 1 to 35 mole percent, preferably, 5 to 25 mole percent, more preferably, 10 to 20 mole percent, and even more preferably, 8 to 15 mole percent. of the residues of 2,2'-(sulfonylbis(4,1-phenyeneoxy)-bis(ethanol); based on the total mole percentage of diol residues equaling 100 mole percent.

Other modifying glycol residues [other than 1,4-cyclohexanedimethanol, ethylene glycol, and 2,2'-(sulfonylbis(4,1-phenyeneoxy)-bis(ethanol] useful in polyester (A) of this invention include but are not limited to 1,2-propanediol, 1,3-propanediol, 2,2-dimethyl-1,3-propanediol, 1,4-butanediol, 1,5-pentanediol, 1,6-hexanediol, 1,2-cyclohexanediol, 1,4-cyclohexanediol, 1,8-octanediol, 1,2-, and 1,3-cyclohexanedimethanol, 2,2,4-trimethyl-1,3-pentanediol, 2,2,4,4-tetramethyl-1,3-cyclobutanediol, or combinations of one or more of any of these modifying glycols. The glycol component can also be modified with about 0 to about 10 mole percent polyethylene glycol, for example, diethylene glycol and triethylene glycol or polytetramethylene glycol to enhance elastomeric behavior.

The cycloaliphatic diols, for example, 1,3- and 1,4-cyclohexanedimethanol, may be present as their pure cis or trans isomers or as a mixture of cis and trans isomers. In another example, the diol residues may comprise from about 50 to about 65 mole percent of the residues of 1,4-cyclohexanedimethanol, about 1 to 49 mole percent of the residues of ethylene glycol, 1 to 35 mole percent of the residues 2,2'-(sulfonylbis(4,1-phenyeneoxy)-bis(ethanol); and from about 0 to 10 mole percent of the modifying glycol residues. In a further example, the diol residues may comprise from about 55 to about 65 mole percent of the residues of 1,4-cyclohexanedimethanol, from about 20 to about 40 mole percent of the residues of ethylene glycol, and from about 5 to about 25 mole percent of the residues of the residues 2,2'-(sulfonylbis(4,1-phenyeneoxy)-bis(ethanol), and from 0 to 10 mole percent of modifying glycol residues. In another example, the diol residues may comprise from about 58 to 64 mole percent of the residues of 1,4-cyclohexanedimethanol, from about 20 to 40 mole percent of ethylene glycol residues, from 10 to 20 mole percent of the residues 2,2'-(sulfonylbis(4,1-phenyeneoxy)-bis(ethanol), and 0 to 10 mole percent of other modifying glycols [other than 1,4-cyclohexanedimethanol, ethylene glycol, and of the residues 2,2'-(sulfonylbis(4,1-phenyeneoxy)-bis(ethanol]. In yet another example, the diol residues may comprise from about 58 to 64 mole percent of the residues of 1,4-cyclohexanedimethanol, from about 20 to about 40 mole percent of the residues of ethylene glycol, from about 8 to 15 mole percent of the residues 2,2'-(sulfonylbis(4,1-phenyeneoxy)-bis(ethanol), and from about 0 to 10 mole percent modifying diol residues.

In connection with any of the described ranges for mole percentages of the diol residues present herein, any of the described mole percentages of the diacid residues may be used. In combination with the preferred ranges for the mole percentages of the diol residues stated herein, it is another embodiment of the invention that the diacid residues of polyester (A) comprise about 80 to about 100, preferably about 90 to 100 mole percent of the residues of terephthalic acid.

The polymer compositions of the invention typically comprise from about 1 to 99 weight percent, preferably 20 to 99 weight percent, more preferably, about 40 to 90 weight percent, and even more preferably, 50 to 80 weight percent, and yet even more preferably 60 to 75 weight percent of polyester(s) (A), and about 99 to 1 weight percent, preferably 1 to 80 weight percent, more preferably, about 10 to 60 weight percent, even more preferably, about 20 to 50 weight percent, and yet even more preferably, 25 to 40 weight percent, of polycarbonate(s) (B), where the total weight percentages of polyester(s) (A) and polyesters (B).

Polyester(s) (A) and/or polycarbonate(s) (B) comprises from about 0 to about 10 weight percent (wt %), preferably, from about 0.05 to about 5 weight percent, more preferably, from about 0.01 to 1 weight percent, and even more preferably, 0.1 to 0.7 weight percent, based on the total weight of the polyester or polycarbonate, of one or more residues of a branching monomer having 3 or more carboxyl substituents, hydroxyl substituents, or a combination thereof.

Examples of branching monomers include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. Preferably, the branching monomer residues comprise about 0.1 to about 0.7 mole percent of one or more residues of: trimellitic anhydride, pyromellitic dianhydride, glycerol, sorbitol, 1,2,6-hexanetriol, pentaerythritol, trimethylolethane, or trimesic acid. The branching monomer may be added to the polyester reaction mixture or blended with the polyester in the form of a concentrate as described, for example, in U.S. Pat. Nos. 5,654,347 and 5,696,176.

The 1,4-cyclohexanedimethanol residues typically have a trans isomer content in the range of about 60 to 100%. However, a preferred isomer content is in the range of about 60 to about 80% trans isomer.

The polyesters are readily prepared by conventional methods well known in the art. For example, melt phase or a combination of melt phase and solid phase polycondensation techniques may be used if desired. The diacid residues of the polyesters may be derived from the dicarboxylic acid or a derivative of the diacid such as the lower alkyl esters, e.g., dimethyl terepthalate, acid halides, e.g., diacid chlorides, or, in some cases, anhydrides.

The polyesters present in the instant invention are readily prepared from the appropriate dicarboxylic acids, esters, anhydrides, or salts, the appropriate diol or diol mixtures, and branching monomers using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters included in the present invention are prepared by procedures known to persons skilled in the art, for example, by processes in homogenous solution, by transesterification processes in the melt and by two phase interfacial processes. The reaction of the diol, dicarboxylic acid, and branching monomer components may be carried out using conventional polyester polymerization conditions. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed. Additional information on preparing amorphous polyesters can be found in U.S. Pat. Nos. 6,120,889 and 6,287,656 which discloses amorphous copolyesters containing residues derived from 2,2'-[2,2]-(sulfonylbis(4,1-phenyleneoxy)bis(ethanol).

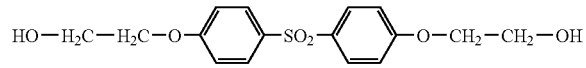

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components and the branching monomer component. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction. Examples of the catalyst materials that may be used in the synthesis of the polyesters utilized in the present invention include titanium, manganese, zinc, cobalt, antimony, gallium, lithium, calcium, silicon and germanium. Such catalyst systems are described in U.S. Pat. Nos. 3,907,754, 3,962,189, 4,010,145, 4,356,299, 5,017,680, 5,668,243 and 5,681,918, herein incorporated by reference in their entirety. Preferred catalyst metals include titanium and manganese and most preferred is titanium. The amount of catalytic metal used may range from about 5 to 100 ppm but the use of catalyst concentrations of about 5 to about 35 ppm titanium is preferred in order to provide polyesters having good color, thermal stability and electrical properties. Phosphorus compounds frequently are used in combination with the catalyst metals and any of the phosphorus compounds normally used in making polyesters may be used. Up to about 100 ppm phosphorus typically may be used.

The term "polycarbonate" is herein defined as the condensation product of a carbonate source and a diol source, having a carbonate component containing 100 mole percent carbonate units and a diol component containing 100 mole percent diol residues, for a total of 200 mole percent monomeric units. The term "diol" as used herein, includes both aliphatic and aromatic compounds having two hydroxyl groups, while the term "glycol" refers to aliphatic and aromatic/aliphatic compounds having hydroxyl groups.

The term "polycarbonate" as used herein embraces those polycarbonates comprising repeating units or residues of the formula

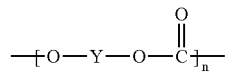

wherein Y is a divalent aromatic or aliphatic radical derived from a dihydroxyaromatic compound or a dihydroxyaliphatic compound of the formula HO—Y—OH and wherein n equals the number of repeating units. Typical dihydroxyaromatic compounds are 2,2-bis-(4-hydroxyphenyl)propane, also known as bisphenol A; bis(4-hydroxyphenyl)methane; 2,2-bis(4-hydroxy-3-methylphenyl)propane; 4,4-bis(4-hydroxyphenyl)heptane; 2,2-(3,5,3',5'-tetrachloro-4,4'-dihydroxyphenyl)propane; 2,2-(3,5,3',5'-tetrabromo-4,4'-dihydroxyphenol)propane; 3,3'-dichloro-3,3'-dichloro-4,4'-dihydroxydiphenyl)methane; 2,2'-dihydroxydiphenylsulfone, and 2,2'-dihydroxyl phenylsulfide. In one embodiment, HO—Y—OH is 2,2-bis-(4-hydroxyphenyl)propyl, in which case, the polycarbonate is a "bisphenol A polycarbonate".

Suitable examples of commercially available bisphenol A polycarbonate include LEXAN, from General Electric, and MAKROLON, from Bayer, Inc.

The polycarbonate portion of the present blend has a diol component containing about 90 to 100 mole percent bisphenol A units, wherein the total mole percent of diol units is 100 mole percent. From about 0 to about 10 mole percent of the diol component of the polycarbonate portion can be substituted with units of other modifying aliphatic or aromatic diols, besides bisphenol A, having from 2 to 16 carbon atoms. It is preferable to have at least 95 mole percent of diol units in the polycarbonate being bisphenol A, more preferably, 100 mole percent. Suitable examples of modifying aromatic diols include the aromatic diols disclosed in the U.S. Pat. Nos. 3,030,335 and 3,317,466.

The polycarbonates (B) included in the second component of the above-described embodiment of the present invention may be prepared in the melt, in solution, or by interfacial polymerization techniques well known in the art. Suitable methods include the steps of reacting a carbonate source with a diol at a temperature of about 0° C. to 315° C. at a pressure of about 0.1 to 760 mm Hg for a time sufficient to form a polycarbonate according to known procedures in the art. Commercially available polycarbonate that are typically used in the present invention, are normally made by reacting an aromatic diol with a carbonate source such as phosgene, dibutyl carbonate or diphenyl carbonate to incorporate 100 mole percent of carbonate units, along with 100 mole percent diol units into the polycarbonate. Methods for preparing polycarbonates are known in the art and are described, for example, in U.S. Pat. Nos. 4,452,933, 5,498,688, 5,494,992, and 5,489,665, which are hereby incorporated by reference herein in their entireties.

Examples of suitable carbonate sources include carbonyl bromide, carbonyl chloride, and mixtures thereof; diphenyl carbonate; a di(halophenyl)carbonate, e.g., di(trichlorophenyl) carbonate, di(tribromophenyl) carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butyl-phenol, and the like. The preferred molecular weight regulator is phenol or an alkylated phenol.

The acid acceptor may be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts that can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The inherent viscosity of the polycarbonate portion of the blends accoding to the present invention is preferably at least about 0.3 dL/g, more preferably at least 0.5 dL/g, determined at 25° C. in 60/40 weight/weight phenol/tetrachloroethane.

Branched polycarbonates are also useful in the present invention. Branching is accomplished when preparing a polycarbonate; generally, a dihydric phenol, such as bisphenol A, is reacted with phosgene with the use of optional mono-functional compounds as chain terminators and tri-functional or higher functional compounds as branching or crosslinking agents. Reactive acyl halides are also condensation polymerizable and have been used in polycarbonates as terminating compounds (mono-functional), comonomers (di-functional), or branching agents (tri-functional or higher).

One method of forming branched polycarbonates, disclosed, for example, in U.S. Pat. No. 4,001,884, involves the incorporation of an aromatic polycarboxylic acid or functional derivative thereof in a conventional polycarbonate-forming reaction mixture. The examples in the '884 patent demonstrate such incorporation in a reaction in which phosgene undergoes reaction with a bisphenol, under alkaline conditions typically involving a pH above 10. Experience has shown that a preferred aromatic polycarboxylic acid derivative is trimellitic acid trichloride. Also disclosed in the aforementioned patent is the employment of a monohydric phenol as a molecular weight regulator; it functions as a chain termination agent by reacting with chloroformate groups on the forming polycarbonate chain.

U.S. Pat. No. 4,367,186 disclose a process for producing cross-linked polycarbonates wherein a cross-linkable polycarbonate contains methacrylic acid chloride as a chain terminator. A mixture of bisphenol A, aqueous sodium hydroxide, and methylene chloride is prepared. To this is added a solution of methacrylic acid chloride in methylene chloride. Then, phosgene is added, and an additional amount of aqueous sodium hydroxide is added to keep the pH between 13 and 14. Finally, the triethylamine coupling catalyst is added.

EP 273 144 discloses a branched poly(ester)carbonate which is end capped with a reactive structure of the formula —C(O)—CH=CH—R, wherein R is hydrogen or C1-3 alkyl. This polycarbonate is prepared in a conventional manner using a branching agent, such as trimellityl trichloride and an acryloyl chloride to provide the reactive end groups. According to the examples, the process is carried out by mixing water, methylene chloride, triethylamine, bisphenol A, and optionally para-t-butyl phenol as a chain terminating agent. The pH is maintained at 9 to 10 by addition of aqueous sodium hydroxide. A mixture of terephthaloyl dichloride, isophthaloyl dichloride, methylene chloride, and optionally acryloyl chloride, and trimellityl trichloride is added dropwise. Phosgene is then introduced slowly into the reaction mixture.

Randomly branched polycarbonates and methods of preparing them are known from U.S. Pat. No. 4,001,184. At least 20 weight percent of a stoichiometric quantity of a carbonate precursor, such as an acyl halide or a haloformate, is reacted with a mixture of a dihydric phenol and at least 0.05 mole percent of a polyfunctional aromatic compound in a medium of water and a solvent for the polycarbonate. The medium contains at least 1.2 mole percent of a polymerization catalyst. Sufficient alkali metal hydroxide is added to the reaction medium to maintain a pH range of 3 to 6, and then sufficient alkali metal hydroxide is added to raise the pH to at least 9 but less than 12 while reacting the remaining carbonate precursor.

U.S. Pat. No. 6,225,436 discloses a process for preparing polycarbonates which allows the condensation reaction incorporation of an acyl halide compound into the polycarbonate in a manner which is suitable in batch processes and in continuous processes. Such acyl halide compounds can be mono-, di-, tri- or higher-functional and are preferably for branching or terminating the polymer molecules or providing other functional moieties at terminal or pendant locations in the polymer molecule.

U.S. Pat. No. 5,142,088 discloses the preparation of branched polycarbonates, and more particularly to novel intermediates useful in the preparation and a method for conversion of the intermediates via chloroformate oligomers to the branched polycarbonates. One method for making branched polycarbonates with high melt strength is a variation of the melt-polycondensation process where the diphenyl carbonate and Bisphenol A are polymerized together with polyfunctional alcohols or phenois as branching agents.

DE 19727709 discloses a process to make branched polycarbonate in the melt-polymerization process using aliphatic alcohols. It is known that alkali metal compounds and alkaline earth compounds, when used as catalysts added to the monomer stage of the melt process, will not only generate the desired polycarbonate compound, but also other products after a rearrangement reaction known as the "Fries" rearrangement. This is discussed in U.S. Pat. No. 6,323,304. The presence of the Fries rearrangement products in a certain range can increase the melt strength of the polycarbonate resin to make it suitable for bottle and sheet applications. This method of making a polycarbonate resin with a high melt strength has the advantage of having lower raw material costs compared with the method of making a branched polycarbonate by adding "branching agents." In general, these catalysts are less expensive and much lower amounts are required compared to the branching agents.

JP 09059371 discloses a method for producing an aromatic polycarbonate in the presence of a polycondensation catalyst, without the use of a branching agent, which results in a polycarbonate possessing a branched structure in a specific proportion. In particular, JP 09059371 discloses the fusion-polycondensation reaction of a specific type of aromatic dihydroxy compound and diester carbonate in the presence of an alkali metal compound and/or alkaline earth metal compound and/or a nitrogen-containing basic compound to produce a polycarbonate having an intrinsic viscosity of at least 0.2. The polycarbonate is then subject to further reaction in a special self-cleaning style horizontal-type biaxial reactor having a specified range of the ratio L/D of 2 to 30 (where L is the length of the horizontal rotating axle and D is the rotational diameter of the stirring fan unit). JP 09059371 teaches the addition of the catalysts directly to the aromatic dihydroxy compound and diester carbonate monomers.

U.S. Pat. No. 6,504,002 discloses a method for production of a branched polycarbonate composition, having increased melt strength, by late addition of branch-inducing catalysts to the polycarbonate oligomer in a melt polycondensation process, the resulting branched polycarbonate composition, and various applications of the branched polycarbonate composition. The use of polyhydric phenols having three or more hydroxy groups per molecule, for example, 1,1,1-tris-(4-hydroxyphenyl)ethane (THPE), 1,3,5-tris-(4-hydroxyphenyl)benzene, 1,4-bis-[di-(4-hydroxyphenyl)phenylmethyl]benzene, and the like, as branching agents for high melt strength blow-moldable polycarbonate 30 resins prepared interfacially has been described in U.S. Pat. Nos. Re. 27,682 and 3,799,953.

Other methods known to prepare branched polycarbonates through heterogeneous interfacial polymerization methods include the use of cyanuric chloride as a branching agent (U.S. Pat. No. 3,541,059), branched dihydric phenols as branching agents (U.S. Pat. No. 4,469,861), and 3,3-bis-(4-hydroxyaryl)-oxindoles as branching agents (U.S. Pat. No. 4,185,009). Additionally, aromatic polycarbonates end-capped with branched alkyl acyl halides and/or acids and said to have improved properties are described in U.S. Pat. No. 4,431,793.

Trimellitic triacid chloride has also been used as a branching agent in the interfacial preparation of branched polycarbonate. U.S. Pat. No. 5,191,038 discloses branched polycarbonate compositions having improved melt strength and a method of preparing them from aromatic cyclic polycarbonate oligomers in a melt equilibration process.

In all of the embodiments of the invention, the polymer compositions of the invention may also optionally comprise at least one salt (C) prepared from the reaction of one or more acidic phosphorus-containing compounds and one or more basic organic compounds which contain nitrogen. Salt (C) useful in the invention is prepared by the reaction of one or more acidic phosphorus-containing compounds with one or more basic organic compounds preferably containing nitrogen, wherein the phosphorus-containing compounds are selected from compounds having the formula:

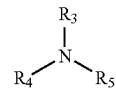 (1)

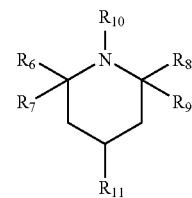 (2)

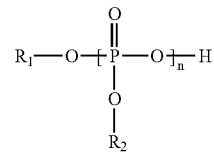 (3)

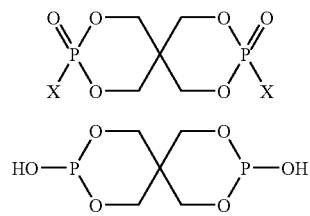 (4)

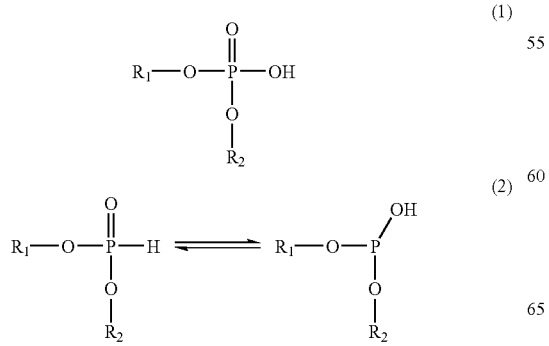 (5)

wherein
$R_1$ and $R_2$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;
n is 2 to 500; and
X is selected from hydrogen and hydroxy;

and wherein the basic organic compounds are selected from compounds having the formulas:

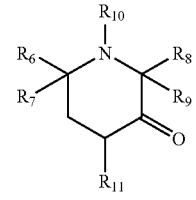 (1)

(2)

(3)

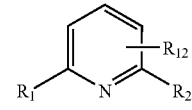 (4)

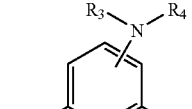 (5)

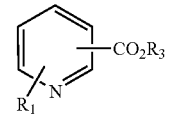 (6)

-continued
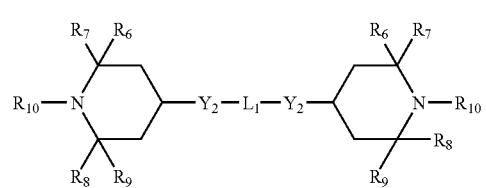
(7)
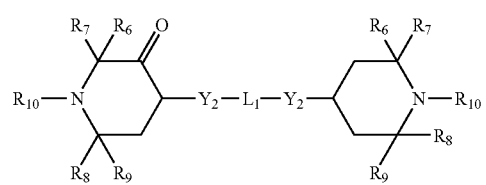
(8)
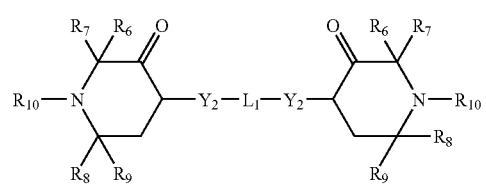
(9)
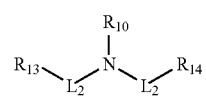
(10)
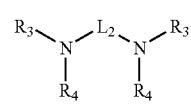
(11)
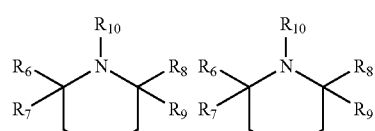
(12)
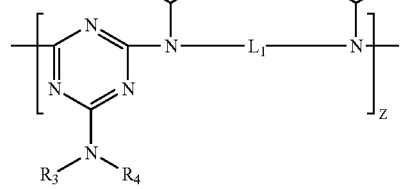
(13)
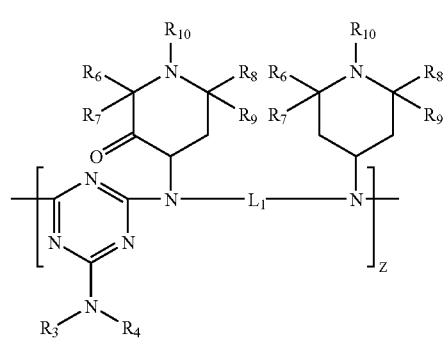
-continued
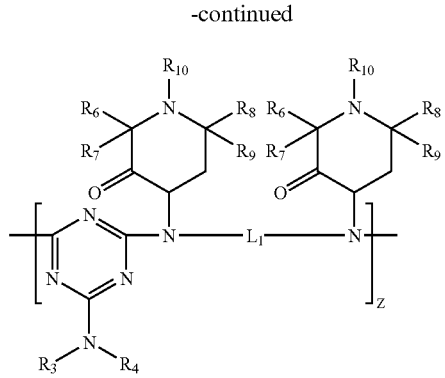
(14)
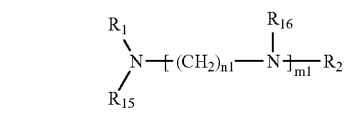
(15)
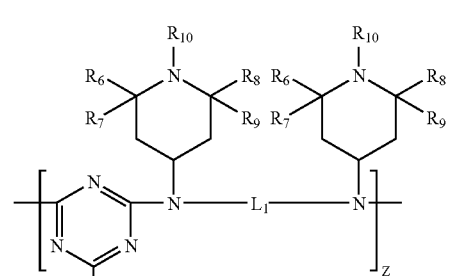
(16)
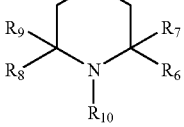
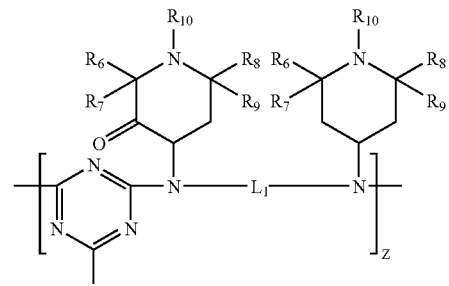
(17)

-continued

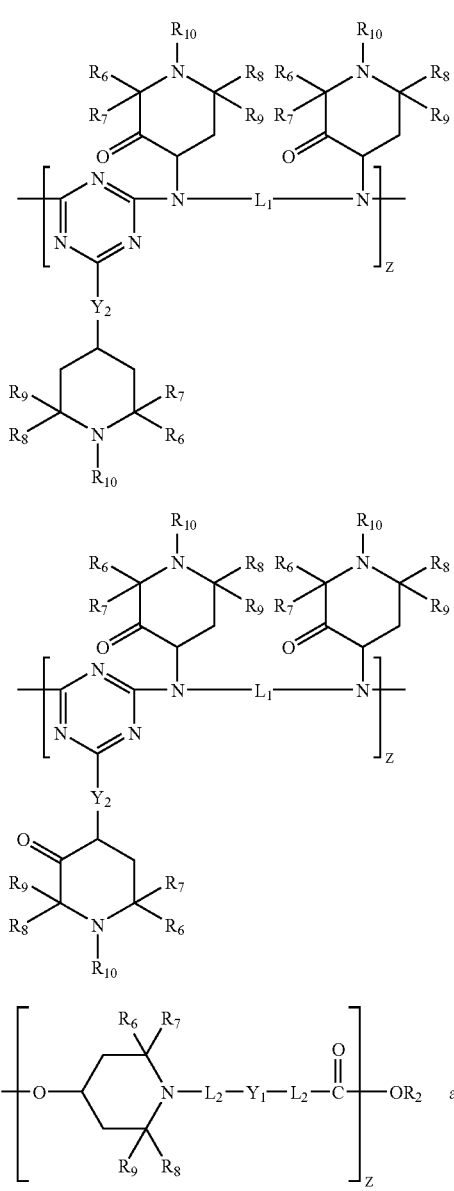

(18)

(19)

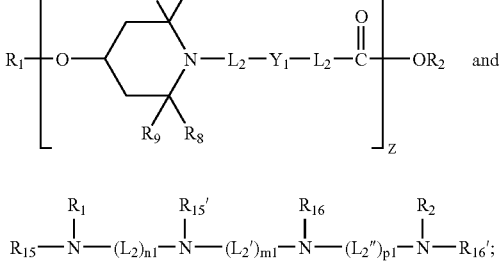

(20)

$$R_{15}-\overset{R_1}{\underset{|}{N}}-(L_2)_{n1}-\overset{R_{15}'}{\underset{|}{N}}-(L_2')_{m1}-\overset{R_{16}}{\underset{|}{N}}-(L_2'')_{p1}-\overset{R_2}{\underset{|}{N}}-R_{16}';$$

(21)

wherein $R_1$ and $R_2$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;

$R_3$, $R_4$, and $R_5$ are independently selected from hydrogen, $C_1$–$C_{22}$-alkyl, substituted $C_1$–$C_{22}$-alkyl, $C_3$–$C_8$-cycloalkyl, and substituted $C_3$–$C_8$-cycloalkyl wherein at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl;

$R_{10}$ is selected from hydrogen, —$OR_6$, $C_1$–$C_{22}$-alkyl, substituted $C_1$–$C_{22}$-alkyl, $C_3$–$C_8$-cycloalkyl, substituted $C_3$–$C_8$-cycloalkyl;

$R_{11}$ is selected from hydrogen; $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl, —$Y_1$—$R_3$ or a succinimido group having the formula

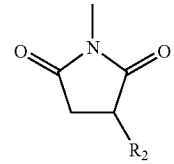

$R_{12}$ is selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl and may be located at the 2, 3 or 4 positions on the aromatic ring;

the —$N(R_3)(R_4)$ group may be located at the 2, 3 or 4 positions on the pyridine ring of nitrogen compound (5);

the —$CO_2R_3$ and $R_1$ groups may be located at any of the 2, 3, 4, 5, 6 positions of the pyridine ring of nitrogen compound (6);

$L_1$ is a divalent linking group selected from $C_2$–$C_{22}$-alkylene; —$(CH_2CH_2-Y)_{1-3}$—$CH_2CH_2$—; $C_3$–$C_8$-cycloalkylene; arylene; or —CO—$L_2$—OC—;

$L_2$, $L_2'$ and $L_2''$ are independently selected from $C_1$–$C_{22}$-alkylene, arylene, —$(CH_2CH_2-Y_1)_{1-3}$—$CH_2CH_2$— and $C_3$–$C_8$-cycloalkylene;

$Y_1$ is selected from —OC(O)—, —NHC(O)—, —O—, —S—, —$N(R_1)$—;

$Y_2$ is selected from —O— or —$N(R_1)$—;

$R_{13}$ and $R_{14}$ are independently selected from —O—$R_2$, and —$N(R_2)_2$;

Z is a positive integer of up to about 20, preferably up to about 6;

m1, n1 and p1 are independently selected from 1 to about 12;

$R_{15}$, $R_{15}'$, $R_{16}$ are $R_{16}'$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl, and radical A wherein radical A is selected from the following structures:

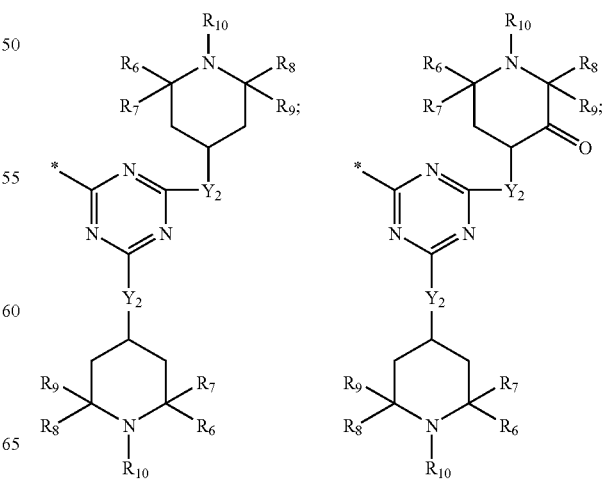

-continued

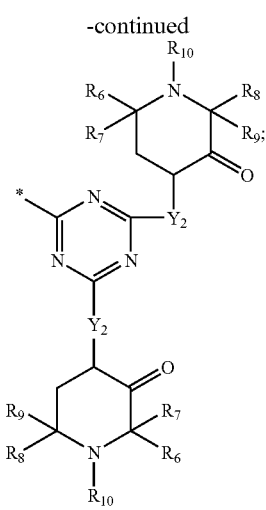

Radical A structures wherein * designates the position of attachment.

preferably at least one of $R_{15}$ and $R_{16}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$–$C_{22}$-alkyl" denotes a saturated hydrocarbon radical which contains one to twenty-two carbons and which may be straight or branched-chain. Such $C_1$–$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$–$C_{22}$-alkyl" refers to $C_1$–$C_{22}$-alkyl radicals as described above which may be substituted with one or more substituents selected from hydroxy, halogen, cyano, aryl, heteroaryl, $C_3$–$C_8$-cycloalkyl, substituted $C_3$–$C_8$-cycloalkyl, $C_1$–$C_6$-alkoxy, $C_2$–$C_6$ alkanoyloxy and the like.

The term "$C_3$–$C_8$-cycloalkyl" is used to denote a cycloaliphatic hydrocarbon radical containing three to eight carbon atoms. The term "substituted $C_3$–$C_8$-cycloalkyl" is used to describe a $C_3$–$C_8$-cycloalkyl radical as detailed above containing at least one group selected from $C_1$–$C_6$-alkyl, $C_1$–$C_6$-alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$–$C_6$-alkyl; $C_1$–$C_6$-alkoxy; phenyl, and phenyl substituted with $C_1$–$C_6$-alkyl; $C_1$–$C_6$-alkoxy; halogen and the like; $C_3$–$C_8$-cycloalkyl; halogen; hydroxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2-and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$–$C_6$-alkoxy" and "$C_2$–$C_6$-alkanoyloxy" are used to represent the groups —O—$C_1$–$C_6$-alkyl and —OCOC$_1$–$C_6$-alkyl, respectively, wherein "$C_1$–$C_6$-alkyl" denotes a saturated hydrocarbon that contains 1–6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$–$C_{22}$-alkylene" is used to denote a divalent hydrocarbon radical that contains from two to twenty-two carbons and which may be straight or branched chain and which may be substituted with one or more substituents selected from hydroxy, halogen, $C_1$–$C_6$-alkoxy, $C_2$–$C_6$-alkanolyloxy and aryl. The term "$C_3$–$C_8$-cycloalkylene" is used to denote divalent cycloaliphatic radicals containing three to eight carbon atoms and these are optionally substituted with one or more $C_1$–$C_6$-alkyl groups. The term "arylene" is used to denote 1,2-, 1,3-, and 1,4-phenylene radicals and these optionally substituted with $C_1$–$C_6$—alkyl, $C_1$–$C_6$-alkoxy and halogen.

Salt (C) useful in the second component of the invention may be prepared by bringing together the acidic phosphorus-containing compound and the basic nitrogen-containing organic compound in a suitable manner. A suitable manner is any procedure that involves contacting the acidic phosphorus-containing acid with the basic organic compound. For example, the acidic phosphorus-containing compound and the basic nitrogen-containing organic compound may be dissolved in appropriate solvents and the solutions mixed followed by precipitation of the reaction product; mixing the phosphorus-containing acid and the basic organic compound without solvent; and the like.

The ratio of the number of phosphorus atoms in the acidic phosphorus-containing compound to the number of basic nitrogen atoms in the basic organic compound may be in the range of about 0.05 to about 2, preferably from about 0.25 to about 1.1.

The salt or salts useful in the second component of the invention typically is present in the polymer compositions in concentrations ranging from about 0.01 to about 0.25 weight percent based on the total weight of the polymer composition, i.e., the total weight of polyester(s) (A), polycarbonate (s) (B), and optionally, Salt(s) (C), as well as any additional components present such as stabilizers and pigments and colorants. Concentrations of Salt(s) (C) within this range typically are effective to improve the color of polyesters and polyester-polycarbonate compositions. Additionally, the color of polyester compositions that contain UV absorbers and/or phenolic antioxidants is improved. The concentration of the Salt(s) (C) preferably is about 0.05 to 0.15 weight percent (same weight basis as described).

The acidic phosphorus-containing compounds of Salt(s) (C) preferably are phosphorous acid, phosphoric acid and polyphosphoric acid, most preferably phosphorous acid.

Examples of suitable basic organic compounds useful in preparing Salt(s)(C) include alkyl amines such as triethylamine and 2,2,6,6-tetramethylpiperidine, pyridine and substituted pyridines, piperidine and substituted piperidines, morpholine and substituted morpholines and the like. The preferred basic organic compounds are hindered amine light stabilizers (HALS) such as: Cyasorb UV-3346 (Cytec Industries, CAS# 90751-07-8), Cyasorb UV-3529 (Cytec Industries, CAS# 193098-40-7), Cyasorb UV-3641 (Cytec Industries, CAS# 106917-30-0), Cyasorb UV-3581 (Cytec Industries, CAS# 79720-19-7), Cyasorb UV-3853 (Cytec Industries, CAS# 167078-06-0), Cyasorb UV-3853S (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 10699043-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631-43-4), Mark LA 63 (Asahi Denka Co., Ltd. Co., Ltd. Co., CAS# 115055-30-6), Mark LA 68 (Asahi Denka Co., Ltd., CAS# 100631-44-5), Hostavin N 20 (Clariant Corp., CAS# 95078-42-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061 (Sumitomo Chemical Company, CAS# 84214-94-8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizer may be listed in the *Plastic Additives Handbook 5$^{th}$ Edition* (Hanser Gardner Publications, Inc., Cincinnati, Ohio, USA, 2001).

The hindered amine light stabilizers of Salt(s)(D) having above formulas (2), (3), (7), (8), (9), (12), (13), (14), (15), (16), (17), (18), (19) and preferred basic compounds. Chimassorb 944 (Ciba Specialty Chemicals, CAS# 71878-19-8), Cyasorb UV-3529 (Cytec Industries, CAS# 193098-40-7), Chimassorb 119 (Ciba Specialty Chemicals, CAS# 106990-43-6) and Tinuvin 770 (Ciba Specialty Chemicals, CAS# 52829-07-9) and any equivalents thereof are specific examples of the preferred basic compounds. A more preferred groups of the basic nitrogen compounds are the hindered amine light stabilizers having above formulas (2), (3), (7), (8), (9), (12), (13), (14), (15), (16), (17), (18) and (19) wherein radi hydrogen or C1–C22 alkyl and formula (15) wherein at least one of R15 and R16 represents radical A wherein R10 is hydrogen or C1–C22 alkyl. The most preferred are high molecular weight HALS wherein the molecular weight is greater than about 1000 such as Cyasorb UV-3529 (Cytec Industries, CAS# 193098-40-7). The most preferred HALS correspond to formula (12) set forth above wherein R6=R7=R8=R9=R10=methyl, (R3)(R4)N— collectively represent morpholino, L1 is C1 to C6 alkylene, and Z is 1 to 6. Additionally, the hindered amine light stabilizers having above formulas (12), (13), (14), (15), (16), (17), (18) and (19) wherein radical R10 is hydrogen or $C_1$–$C_{22}$ alkyl and formula (15) wherein at least one of R15 and R16 represents radical A wherein R10 is hydrogen or C1–C22 alkyl are particularly preferred for improved hydrolytic stability of polyester, polycarbonate and polyester-polycarbonate composition.

It is another embodiment of the invention that Salt(s)(D) is useful in any embodiment of the invention in combination with at least one triazine UV light absorber.

The polymer compositions of the present invention may include any various additives conventional in the art. For example, the polymer blend can include from about 0.01 to about 50 weight percent, based on the total weight of the composition, of at least one additional additive selected from a lubricant, a non-polymeric plasticizer, flame retardants (including but not limited to phosphorous containing and halogenated flame retardants), thermal stabilizers, an antioxidant (including but not limited to phenolic antioxidants and hindered phenols), a pro-oxidant, an acid scavenger, impact modifiers, ultraviolet light stabilizers (such as triazine), promoters of photodegradation, an antistatic agent, a pigment, dyes, or colorants and pigments (such as organic colorants, inorganic colorants and or white pigments such as $TiO_2$, ZnO and baryta), synergists, processing aids, phosphite stabilizers, phosphonite stabilizers and other stabilizers known to one skilled in the art. Typical non-polymeric plasticizers include dioctyl adipate, phosphates, and diethyl phthalate. Representative inorganics include, talc, TiO2, CaCO3, NH4CL, and silica. Colorants can be monomeric, oligomeric, and polymeric. Preferred polymeric colorants are aliphatic polyesters, aliphatic-aromatic copolyesters, or aromatic polyesters in which the color producing monomer, i.e., a dye, is covalently incorporated into the polymer. Such representative polymeric colorants are described by Weaver et al. in U.S. Pat. Nos. 4,892,922, 4,892,923, 4,882,412, 4,845,188, 4,826,903 and 4,749,773 the entire disclosures of which are incorporated herein by reference. In addition to the additives described herein, the compositions of the present invention can include at least one other modifying polymer.

The terms "phenolic antioxidants" and "hindered phenol" are primary antioxidants that are known to those skilled in the art and may be represented by the structures listed on pages 98–108 in the *Plastic Additives Handbook 5$^{th}$ Edition* (Hanser Gardner Publications, Inc., Cincinnati, Ohio, USA, 2001), incorporated herein by reference in its entirety. Some common phenolic antioxidants are as follows: Irganox 1010 (Ciba Specialty Chemicals, CAS# 6683-19-8), Irganox 1330 (Ciba Specialty Chemicals, CAS# 1709-70-2) and Irganox 3114 (Ciba Specialty Chemicals, CAS# 27676-62-6).

The terms "phosphite stabilizers" and "phosphonite stabilizers" refer to secondary antioxidants that are known to those skilled in the art and may be represented by the structures listed on pages 109-112 in the *Plastic Additives Handbook 5$^{th}$ Edition* (Hanser Gardner Publications, Inc., Cincinnati, Ohio, USA, 2001), incorporated herein by reference in its entirety. Some common phosphite stabilizers are as follows: Ultranox 626 (GE Specialty Chemicals, CAS# 26741-53-7), Irgafos 168 (Ciba Specialty Chemicals, CAS# 31570-04-4), Weston 619 (GE Specialty Chemicals, CAS# 3806-34-6) and Doverphos S-9228 (Dover Chemicals, CAS# 154862-43-8).

The term "halogenated flame-retardants" is defined as compounds that can contain one or more of the following: fluorine, chlorine, bromine, and iodine, which act in such a way as to decrease the flammability of the polymer composition. More preferred are compounds that contain bromine such as brominated polycarbonate, brominated polystyrene, and the like.

Although not essential, the polymer blends of the invention may comprise a plasticizer. The presence of the plasticizer is useful to enhance flexibility and the good mechanical properties of the calendered film or sheet. The plasticizer also helps to lower the processing temperature of the polyesters. The plasticizers typically comprise one or more aromatic rings. The preferred plasticizers are soluble in the polyester as indicated by dissolving a 5-mil (0.127 mm) thick film of the polyester to produce a clear solution at a temperature of 160° C. or less. More preferably, the plasticizers are soluble in the polyester as indicated by dissolving a 5-mil (0.127 mm) thick film of the polyester to produce a clear solution at a temperature of 150° C. or less. The solubility of the plasticizer in the polyester may be determined as follows:

1. Placing into a small vial a ½ inch section of a standard reference film, 5 mils (0.127 mm) in thickness and about equal to the width of the vial.
2. Adding the plasticizer to the vial until the film is covered completely.
3. Placing the vial with the film and plasticizer on a shelf to observe after one hour and again at 4 hours. Note the appearance of the film and liquid.
4. After the ambient observation, placing the vial in a heating block and allow the temperature to remain constant at 75° C. for one hour and observe the appearance of the film and liquid.
5. Repeating step 4 for each of the following temperatures (° C.): 100, 140, 150, and 160.

Examples of plasticizers potentially useful in the invention are as follows:

TABLE A

| Plasticizers |
|---|
| Adipic Acid Derivatives |
| Dicapryl adipate |
| Di-(2-ethylhexyl adipate) |
| Di(n-heptyl, n-nonyl) adipate |
| Diisobutyl adipate |
| Diisodecyl adipate |
| Dinonyl adipate |
| Di-(tridecyl) adipate |
| Azelaic Acid Derivatives |
| Di-(2-ethylhexyl) azelate) |
| Diisodecyl azelate |
| Diisoctyl azealate |
| Dimethyl azelate |
| Di-n-hexyl azelate |
| Benzoic Acid Derivatives |
| Diethylene glycol dibenzoate (DEGDB) |
| Dipropylene glycol dibenzoate |
| Propylene glycol dibenzoate |
| Polyethylene glycol 200 dibenzoate |
| Neopentyl glycol dibenzoate |
| Citric Acid Derivatives |
| Acetyl tri-n-butyl citrate |
| Acetyl triethyl citrate |
| Tri-n-Butyl citrate |
| Triethyl citrate |
| Dimer Acid Derivatives |
| Bis-(2-hydroxyethyl dimerate) |

TABLE A-continued

| Plasticizers |
|---|
| Epoxy Derivatives |
| Epoxidized linseed oil |
| Epoxidized soy bean oil |
| 2-Ethylhexyl epoxytallate |
| Fumaric Acid Derivatives |
| Dibutyl fumarate |
| Glycerol Derivatives |
| Glycerol Tribenzoate |
| Glycerol triacetate |
| Glycerol diacetate monolaurate |
| Isobutyrate Derivative |
| 2,2,4-Trimethyl-1,3-pentanediol, Diisobutyrate |
| Texanol diisobutyrate |
| Isophthalic Acid Derivatives |
| Dimethyl isophthalate |
| Diphenyl isophthalate |
| Di-n-butylphthalate |
| Lauric Acid Derivatives |
| Methyl laurate |
| Linoleic Acid Derivative |
| Methyl linoleate, 75% |
| Maleic Acid Derivatives |
| Di-(2-ethylhexyl) maleate |
| Di-n-butyl maleate |
| Mellitates |
| Tricapryl trimellitate |
| Triisodecyl trimellitate |
| Tri-(n-octyl, n-decyl) trimellitate |
| Triisonyl trimellitate |
| Myristic Acid Derivatives |
| Isopropyl myristate |
| Oleic Acid Derivatives |
| Butyl oleate |
| Glycerol monooleate |
| Glycerol trioleate |
| Methyl oleate |
| n-Propyl oleate |
| Tetrahydrofurfuryl oleate |
| Palmitic Acid Derivatives |
| Isopropyl palmitate |
| Methyl palmitate |
| Paraffin Derivatives |
| Chloroparaffin, 41% Cl |
| Chloroparaffin, 50% Cl |
| Chloroparaffin, 60% Cl |
| Chloroparaffin, 70% Cl |
| Phosphoric Acid Derivatives |
| 2-Ethylhexyl diphenyl phosphate |
| Isodecyl diphenyl phosphate |
| t-Butylphenyl diphenyl phosphate |
| Resorcinol bis(diphenyl phosphate) (RDP) |
| 100% RDP |
| Blend of 75% RDP, 25% DEGDB (by wt) |
| Blend of 50% RDP, 50% DEGDB (by wt) |
| Blend of 25% RDP, 75% DEGDB (by wt) |
| Tri-butoxyethyl phosphate |
| Tributyl phosphate |
| Tricresyl phosphate |
| Triphenyl phosphate |

TABLE A-continued

Plasticizers

Phthalic Acid Derivatives

Butyl benzyl phthalate
Texanol benzyl phthalate
Butyl octyl phthalate
Dicapryl phthalate
Dicyclohexyl phthalate
Di-(2-ethylhexyl) phthalate
Diethyl phthalate
Dihexyl phthalate
Diisobutyl phthalate
Diisodecyl phthalate
Diisoheptyl phthalate
Diisononyl phthalate
Diisooctyl phthalate
Dimethyl phthalate
Ditridecyl phthalate
Diundecyl phthalate
Ricinoleic Acid Derivatives Butyl ricinoleate
Glycerol tri(acetyl) ricinlloeate
Methyl acetyl ricinlloeate
Methyl ricinlloeate
n-Butyl acetyl ricinlloeate
Propylene glycol ricinlloeate
Sebacic Acid Derivatives Dibutyl sebacate
Di-(2-ethylhexyl) sebacate
Dimethyl sebacate
Stearic Acid Derivatives Ethylene glycol monostearate
Glycerol monostearate
Isopropyl isostearate
Methyl stearate
n-Butyl stearate
Propylene glycol monostearate
Succinic Acid Derivatives Diethyl succinate
Sulfonic Acid Derivatives N-Ethyl o,p-toluenesulfonamide
o,p-toluenesulfonamide A similar test to that above is described in *The Technology of Plasticizers*, by J. Kern Sears and Joseph R. Darby, published by Society of Plastic Engineers/Wiley and Sons, New York, 1982, pp 136–137. In this test, a grain of the polymer is placed in a drop of plasticizer on a heated microscope stage. If the polymer disappears, then it is solubilized. The plasticizers can also be classified according to their solubility parameter. The solubility parameter, or square root of the cohesive energy density, of a plasticizer can be calculated by the method described by Coleman et al., *Polymer* 31, 1187 (1990). The most preferred plasticizers will have a solubility parameter ($\delta$) in the range of about 9.5 to about 13.0 $\text{cal}^{0.5} \text{cm}^{-1.5}$. It is generally understood that the solubility parameter of the plasticizer should be within 1.5 units of the solubility parameter of polyester. The plasticizers in Table B that are preferred in the context of this invention are as follows:

TABLE B

Preferred Plasticizers

Glycerol diacetate
monolaurate

TABLE B-continued

Preferred Plasticizers

Texanol diisobutyrate
Di-2-ethylhexyladipate
Trioctyltrimellitate
Di-2-ethylhexylphthalate
Texanol benzyl phthalate
Neopentyl glycol dibenzoate
Dipropylene glycol
dibenzoate
Butyl benzyl phthalate
Propylene glycol dibenzoate
Diethylene glycol dibenzoate
Glycerol tribenzoate Examples of plasticizers which may be used according to the invention are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates. In another example, the plasticizer comprises diethylene glycol dibenzoate, abbreviated herein as "DEGDB".

A flame retardant may be added to the polymer blend at a concentration of about 5 weight percent to about 40 weight percent based on the total weight of the polymer blend. Other examples of flame retardant levels are about 7 weight percent to about 35 weight percent, about 10 weight percent to about 30 weight percent, and about 10 weight percent to about 25 weight percent. Preferably, the flame retardant comprises one or more monoesters, diesters, or triesters of phosphoric acid. The phosphorus-containing flame retardant may also function as a plasticizer for the polyester. In another example, the plasticizer comprises diethylene glycol dibenzoate and the flame retardant comprises resorcinol bis(diphenyl phosphate). The flame retardant film or sheet will typically give a V2 or greater rating in a UL94 burn test. In addition, our flame retardant film or sheet typically gives a burn rate of 0 in the Federal Motor Vehicle Safety Standard 302 (typically referred to as FMVSS 302).

The phosphorus-containing flame retardant is preferably miscible with the polyester or the plasticized polyester. The term "miscible", as used herein," is understood to mean that the flame retardant and the plasticized polyester will mix together to form a stable mixture which will not separate into multiple phases under processing conditions or conditions of use. Thus, the term "miscible" is intended include both "soluble" mixtures, in which flame retardant and plasticized polyester form a true solution, and "compatible" mixtures, meaning that the mixture of flame retardant and plasticized polyester do not necessarily form a true solution but only a stable blend. Preferably, the phosphorus-containing compound is a non-halogenated, organic compound such as, for example, a phosphorus acid ester containing organic substituents. The flame retardant may comprise a wide range of phosphorus compounds well-known in the art such as, for example, phosphines, phosphites, phosphinites, phosphonites, phosphinates, phosphonates, phosphine oxides, and phosphates. Examples of phosphorus-containing flame retardants include tributyl phosphate, triethyl phosphate, tributoxyethyl phosphate, t-Butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants of the invention include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. Typical phosphorus acids that can be employed in the present invention include, but are not limited to: dibenzyl phosphoric acid, dibutyl phosphoric acid, di(2-ethylhexyl) phosphoric acid, diphenyl phosphoric acid, methyl phenyl phosphoric acid, phenyl benzyl phosphoric acid, hexylphosphonic acid, phenylphosphonic acid tolylphosphonic acid, benzyl phosphonic acid, 2-phenylethylphosphonic acid, methylhexylphosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more monoesters, diesters, or triesters of phosphoric acid. In another example, the flame retardant comprises resorcinol bis(diphenyl phosphate), abbreviated herein as "RDP".

Oxidative stabilizers also may be used with polyesters of the present invention to prevent oxidative degradation during processing of the molten or semi-molten material on the rolls. Such stabilizers include esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus containing stabilizers such as Irgafos® available from Ciba-Geigy AG and WESTON® stabilizers available from GE Specialty Chemicals. These stabilizers may be used alone or in combinations Suitable modifying polymers are those which form miscible blends with the polyester(s) (A) and polycarbonate(s) (B). Suitable modifying polymers include other polycarbonates, other polyesters, polyamides, polystyrenes, polyurethanes, polyarylates, liquid crystalline polyesters, vinyl polymers and the like, or a mixture thereof. Suitable modifying polymers may be determined by one of ordinary skill in the polymers art by performing traditional miscibility tests with possible modifying polymers.

A polymer may be determined to be a suitable modifying polymer of the blend of the present invention if a clear blend is formed by: (1) blending the modifying polymer with a pre-existing blend containing the polycarbonate and polyester portions, or (2) blending the modifying polymer with the polycarbonate portion prior to the introduction of the polyester portion, or (3) blending the modifying polymer with the polyester portion prior to the introduction of the polycarbonate portion, or (4) mixing the modifying polymer, polycarbonate portion and polyester portion all together prior to blending.

The blends of the present invention are visually clear as defined herein but can still be further modified by the incorporation of blend modifiers to produce performance blends, which may or may not be visually clear. For example, polyamides such as nylon 6,6 from DuPont, poly (ether-imides) such as ULTEM poly(ether-imide) from General Electric, polyphenylene oxides such as poly(2,6-dimethylphenylene oxide or poly(phenylene oxide)/polystyrene blends such as NORYL resins from General Electric, polyesters, polyphenylene sulfides, polyphenylene sulfide.sulfones, poly(ester-carbonates) such as LEXAN 3250 poly (ester-carbonate), (General Electric), polycarbonates other than LEXAN polycarbonate from General Electric, polyarylates such as ARDEL D100 polyarylate (Smoco), polysulfones, polysulfone ethers, poly(ether-ketones) or aromatic dihydroxy compounds can be used as blend modifiers to modify properties or to reduce flammability. The aromatic dihydroxy compounds used to prepared these polymers are disclosed in U.S. Pat. No. 3,030,335 and U.S. Pat. No. 3,317,466.

The novel polymer compositions also may contain a phosphorus catalyst quencher component which is, typically one or more phosphorus compounds such as a phosphorus acid, e.g., phosphoric and/or phosphorous acids, or an ester of a phosphorus acid such as a phosphate or phosphite ester. Further examples of phosphorus catalyst quenchers are described in U.S. Pat. Nos. 5,907,026 and 6,448,334. The amount of phosphorus catalyst quencher present typically provides an elemental phosphorus content of about 0 to 0.5 weight percent, preferably 0.05 to 0.3 weight percent, based on the total weight of the first and second components of the invention.

It is also possible to use agents such as sulfoisophthalic acid to increase the melt strength of the polyester to a desirable level. In addition, the polymer blends may contain dyes, pigments, fillers, matting agents, antiblocking agents, antistatic agents, blowing agents, chopped fibers, glass, impact modifiers, carbon black, talc, $TiO_2$ and the like as desired. Colorants, sometimes referred to as added to impart a desired neutral hue and/or brightness to the polyester and the calendered product.

The various components of the polymer blends such as, for example, the flame retardant, release additive, plasticizer, and toners, may be blended in batch, semicontinuous, or continuous processes. Small scale batches may be readily prepared in any high-intensity mixing devices well-known to those skilled in the art, such as Banbury mixers, batch mixers, ribbon blenders, roll mill, torque rheometer, a single screw extruder, or a twin screw extruder. Polyester(s) (A) and polycarbonate(s) (B) also may be blended in solution in an appropriate solvent, including but not limited to methylene chloride or a 70/30 mixture of methylene chloride and hexafluoroisopropanol, mixing the solution, and separating the blend composition from solution by preparation of the blend or by evaporation of the solvent.

The melt blending method includes blending the polyester(s) (A), polycarbonate(s) (B), plasticizer, flame retardant, additive, and any additional non-polymerized components at a temperature sufficient to melt the polyester. The melt blending method is a preferred method for producing the blend compositions of the inventions. The blend may be cooled and pelletized for further use or the melt blend can be calendered directly from this molten blend into film or sheet. The term "melt" as used herein includes, but is not limited to, merely softening the polyester. For melt mixing methods generally known in the polymer art, see "Mixing and Compounding of Polymers" (I. Manas-Zloczower & Z. Tadmor editors, Carl Hanser Verlag Publisher, 1994, New York, N.Y.). When colored sheet or film is desired, pigments or colorants may be included in the polyester mixture during the reaction of the diol and the dicarboxylic acid or they may be melt blended with the preformed polyester. A preferred method of including colorants is to use a colorant having thermally stable organic colored compounds having reactive groups such that the colorant is copolymerized and incorporated into the polyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the polyester reaction process after an ester interchange or direct esterification reaction.

A "visually clear" blend is defined herein as one where the article made therefrom has an absence of cloudiness, haziness, and muddiness, when inspected visually. The blends of the invention also exhibit a single glass transition temperature (Tg), as determined by differential scanning calorimetry (DSC). The injection molded articles prepared from the polymer compositions of the present invention are characterized by a novel combination of properties which preferably include polymer compositions having a visual clearness or clarity or haze.

These compositions may be prepared by any method known in the art. These compositions may be compounded in the melt, for example, by using a single screw or twin screw extruder. They may also be prepared by blending in solution. These blends are useful as thermoplastic molding compositions as well as other end uses.

The polyester blend may also be formed into film or sheet using many methods known to those skilled in the art, including but not limited to extrusion and calendering. In the extrusion process, the polyesters, typically in pellet form, are mixed together in a tumbler and then placed in a hopper of an extruder for melt compounding. Alternatively, the pellets may be added to the hopper of an extruder by various feeders, which meter the pellets in their desired weight ratios. Upon exiting the extruder the now homogenous copolyester blend is shaped into a film. The shape of the film is not restricted in any way. For example, it may be a flat sheet or a tube. The film obtained may be stretched, for example, in a certain direction by from 2 to 6 times the original measurements.

The stretching method for the film may be by any of the methods known in the art, such as, the roll stretching method, the long-gap stretching, the tenter-stretching method, and the tubular stretching method. With the use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also the stretching may be done first in one direction and then in the other direction to result in effective biaxial stretching.

In a general embodiment, the polymer blends of the invention are useful in making calendered film and/or sheet on calendering rolls. The polymer blend may also comprise one or more plasticizers to increase the flexibility and softness of calendered polyester film, improve the processing of the polyester, and help to prevent sticking of the polyester to the calender rolls. The invention also provides a process for film or sheet by calendering the novel polymer blends and for the film or sheet produced from such calendering processes. The calendered film or sheet typically have a thickness in the range of about 2 mils (0.05 mm) to about 80 mils (2 mm).

While the inherent viscosity (I.V.) of the polyesters (A) of the present invention is generally from about 0.3 to about 1.2 dL/g, other I.V.s are contemplated within the scope of this invention. The inherent viscosity, abbreviated herein as "I.V.", refers to inherent viscosity determinations made at 25° C. using 0.25 gram of polymer per 50 mL of a solvent composed of 60 weight percent phenol and 40 weight percent tetrachloroethane. The basic method of determining the I.V. of the polyesters herein is set forth in ASTM method D2857-95.

The polymer blends described above may additionally comprise an additive that is effective to prevent sticking of the polyester to the calendering rolls when the polyester is used to make calendered film. As used herein, the term "effective" means that the polyester passes freely between the calendering rolls without wrapping itself around the rolls or producing an excessive layer of polyester on the surface of the rolls. The amount of additive used in the polyester resin composition is typically about 0.1 to about 10 weight percent, based on the total weight percent of the polymer blend. The optimum amount of additive used is determined by factors well known in the art and is dependent upon variations in equipment, material, process conditions, and film thickness. Additional examples of additive levels are about 0.1 to about 5 weight percent and about 0.1 to about 2 weight percent. Examples of additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

Another additive which may be used comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms In the calendering process, higher molecular weight plasticizers are preferred to prevent smoking and loss of plasticizer during the calendering process. The preferred range of plasticizer content will depend on the properties of the base polyester and the plasticizer. In particular, as the Tg of the polyester as predicted by the well-known Fox equation (T. G. Fox, Bull. Am. Phys. Soc., 1, 123 (1956)) decreases, the amount of plasticizer needed to obtain a polymer blend that may be calendered satisfactorily also decreases. Typically, the plasticizer comprises from about 5 to about 50 weight percent (weight percent) of the polymer blend based on the total weight of the polymer blend. Other examples of plasticizer levels are about 10 to about 40 weight percent, about 15 to about 40 weight percent, and about 15 to about 30 weight percent of the polymer blend.

Our invention also includes a process for the manufacture of film or sheet, comprising any of the polymer blends of the invention. In some embodiments, a process is disclosed for making such articles, film, sheet, and/or fibers comprising the steps of injection molding, extrusion blow molding, film/sheet extruding or calendering the polymer blend(s) of the invention.

The present invention is illustrated in greater detail by the specific examples presented below. It is to be understood that these examples are illustrative embodiments and are not intended to be limiting of the invention, but rather are to be construed broadly within the scope and content of the appended claims.

EXAMPLES

The inherent viscosity of the polyesters was determined in 60/40 (wt/wt) phenol/tetrachloroethane at a concentration of 0.5 g/100 mL at 25° C. The glass transition temperatures (Tg's) were determined using a TA Instruments 2950 differential scanning calorimeter (DSC) at a scan rate of 20° C./min. The glycol content of the polyester portion of these blends was determined by proton nuclear magnetic resonance spectroscopy (NMR). Clarity was determined visually. The miscibility of the blends was determined by differential scanning calorimetry and by observation of the clarity of pressed films and molded objects.

The preparation of bisphenol A based polycarbonates is well known in the art (see U.S. Pat. Nos. 3,030,335 and 3,317,466). Lexan, available from General Electric Company and Makrolon 2608, available from Bayer, Inc. are two commercially available bisphenols A based polycarbonate products. For all examples, Makrolon 2608 was used.

Copolyesters are copolymers prepared from terephthalic acid with 2,2'-(sulfonylbis(4,1-phenyleneoxy))-bis(ethanol) (BDS) and various percentages of the glycol 1,4-cyclohexanedimethanol (CHDM) and ethylene glycol (EG). Synthesis was carried out on two scales. Small scale quantities were prepared in a 500 ml round bottom flask and larger quantities were prepared in an 18 gallon stainless-steel batch reactor, with intermeshing spiral agitators.

Copolyester A was prepared from DMT with EG, CHDM, and BDS. To an 18 gallon stainless-steel batch reactor, with intermeshing spiral agitators, 22.56 lbs of DMT, 11.00 lbs of EG, 5.32 lbs of CHDM, and 6.13 lbs of BDS were added. For the synthesis of this material, appropriate amounts of a butanol solution containing the titanium catalyst and an EG solution containing manganese catalyst were added to the reactor to provide 32 parts per million (ppm) titanium and 46 ppm manganese in the final copolyester. The reactor which was under a 10 SCFH nitrogen purge was heated to 200° C. and held for 1.5 hours with agitation. The reactor was then heated to 220° C. and held for 1 hour with agitation. Methanol was removed from the reaction mixture during these hold times as a byproduct. After the 1 hour hold period at 220° C., an appropriate amount of a phosphorous catalyst was added to provide for 23 ppm phosphorous in the final polymer. The temperature was then increased to 280° C. When the reaction mixture reached 240° C., vacuum was applied at a rate of 13 mm/min. When the pressure had dropped to 4-mm and the melt temperature was 280° C., the vacuum was held with agitation for a total of 3 hour 45 minutes. Afterwards the polymer was let down to atmospheric pressure with a nitrogen purge. The polymer was extruded and pelletized. The resulting polymer had an IV value of 0.726, a L* color value of 75.79, an a* color value of −2.33, a b* color value of 7.99; and a DSC $2^{nd}$ cycle Tg=93° C.

Copolyester B was prepared from DMT with EG, CHDM, and BDS. For the synthesis of this material, the appropriate amounts of metal catalysts were added to provide 32 parts per million (ppm) titanium, 46 ppm manganese, and 23 ppm P in the final copolyester. To an 18 gallon stainless-steel batch reactor, with intermeshing spiral agitators, was added appropriate amounts of DMT, EG, CHDM, and BDS. Appropriate amounts of a butanol solution containing the titanium catalyst and an EG solution containing manganese catalyst were added. The reactor which was under a 10 SCFH nitrogen purge was heated to 200° C. and held for 1.5 hours with agitation. The reactor was then heated to 220° C. and held for 1 hour with agitation. Methanol was removed from the reaction mixture during these hold times as a byproduct. The temperature was then increased to 280° C. When the reaction mixture reached 240° C., vacuum was applied at a rate of 13 mm/min. When the pressure had dropped to 4-mm and the melt temperature was 280° C., the vacuum was held with agitation for a total of 3 hour 30 minutes. Afterwards the polymer was let down to a nitrogen purge. The polymer was extruded and pelletized. The resulting polymer had an IV value of 0.697, a L* color value of 76.81, an a* color value of −1.00, a b* color value of 2.26; and a DSC $2^{nd}$ cycle Tg=100.5° C.

Copolyester C was prepared from DMT with EG, CHDM, and BDS. a 500 ml round bottom flask equipped with a ground glass head, a stirrer, and a nitrogen inlet was added 102.8 grams (0.53 moles) of dimethyl terephthalate, 44.6 grams (0.72 moles) of ethylene glycol, 43.9 grams (0.30 moles) of 1,4-cyclohexanedimethanol, 13.7 grams (0.04 moles) of BDS, 50 parts per million (ppm) of titanium catalyst in a butanol solution, 40 ppm manganese catalyst in an ethylene glycol solution, and 80 ppm cobalt catalyst in an ethylene glycol solution. The flask was immersed in a Belmont metal bath and was heated for 1.5 hours at 200° C.

and 2 hours at 210° C. After this time the theoretical amount of methanol had been collected. Sixty ppm of phosphorus catalyst in an ethylene glycol/butanol solution was added and the temperature increased to 280° C. The pressure in the flask was reduced from atmospheric pressure to 0.3 mm of Hg over 5 minutes. The temperature was maintained at 280° C. and the pressure at 0.3 mm for 40 minutes.

Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Three synthesis runs were prepared and the average analytical results are as follows: I.V.=0.835 dL/g; color=L* 76.52, a* −0.55, b* 2.48; DSC $2^{nd}$ cycle Tg=93.6° C.

Copolyester D was prepared from DMT with EG, CHDM, and BDS. To a 500 ml round bottom flask equipped with a ground glass head, a stirrer, and a nitrogen inlet was added 98.9 grams (0.51 moles) of dimethyl terephthalate, 38.8 grams (0.626 moles) of ethylene glycol, 51.1 grams (0.355 moles) of 1,4-cyclohexanedimethanol, 13.2 grams (0.039 moles) of BDS, 50 parts per million (ppm) of titanium catalyst in a butanol solution, 40 ppm manganese catalyst in an ethylene glycol solution, and 80 ppm cobalt catalyst in an ethylene glycol solution. The flask was immersed in a Belmont metal bath and was heated for 1.5 hours at 200° C. and 2 hours at 210° C. After this time the theoretical amount of methanol had been collected. Sixty ppm of phosphorus catalyst in an ethylene glycol/butanol solution was added and the temperature increased to 280° C. The pressure in the flask was reduced from atmospheric pressure to 0.3 mm of Hg over 5 minutes. The temperature was maintained at 280° C. and the pressure at 0.3 mm for 70 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Three synthesis runs were prepared and the average analytical results are as follows: I.V.=0.859 dL/g; color=L* 77.69, a* −0.58, b* 3.21; DSC $2^{nd}$ cycle Tg=94.1° C.

Copolyester E was prepared from DMT with EG, CHDM, and BDS. To a 500 ml round bottom flask equipped with a ground glass head, a stirrer, and a nitrogen inlet was added 83.5 grams (0.43 moles) of dimethyl terephthalate, 26.5 grams (0.4275 moles) of ethylene glycol, 46.4 grams (0.3225 moles) of 1,4-cyclohexanedimethanol, 37.2 grams (0.11 moles) of BDS, 50 parts per million (ppm) of titanium catalyst in a butanol solution, 40 ppm manganese catalyst in an ethylene glycol solution, and 80 ppm cobalt catalyst in an ethylene glycol solution. The flask was immersed in a Belmont metal bath and was heated for 1.5 hours at 200° C. and 2 hours at 210° C. After this time the theoretical amount of methanol had been collected. Sixty ppm of phosphorus catalyst in an ethylene glycol/butanol solution was added and the temperature increased to 280° C. The pressure in the flask was reduced from atmospheric pressure to 0.3 mm of Hg over 5 minutes. The temperature was maintained at 280° C. and the pressure at 0.3 mm for 75 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Three synthesis runs were prepared and the average analytical results are as follows: I.V.=0.691 dL/g; color=L* 76.45, a* −1.09, b* 3.31; DSC $2^{nd}$ cycle Tg=107.2° C.

Copolyester F was prepared from DMT with EG, CHDM, and BDS. To a 500 ml round bottom flask equipped with a ground glass head, a stirrer, and a nitrogen inlet was added 81.3 grams (0.42 moles) of dimethyl terephthalate, 22.7 grams (0.3654 moles) of ethylene glycol, 52.9 grams (0.3675 moles) of 1,4-cyclohexanedimethanol, 36.2 grams (0.1071 moles) of BDS, 50 parts per million (ppm) of titanium catalyst in a butanol solution, 40 ppm manganese catalyst in an ethylene glycol solution, and 80 ppm cobalt catalyst in an ethylene glycol solution. The flask was immersed in a Belmont metal bath and was heated for 1.5 hours at 200° C. and 2 hours at 210° C. After this time the theoretical amount of methanol had been collected. Sixty ppm of phosphorus catalyst in an ethylene glycol/butanol solution was added and the temperature increased to 280° C. The pressure in the flask was reduced from atmospheric pressure to 0.3 mm of Hg over 5 minutes. The temperature was maintained at 280° C. and the pressure at 0.3 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Three synthesis runs were prepared and the average analytical results are as follows: I.V.=0.576 dL/g; color=L* 79.39, a* −0.54, b* −0.37; DSC $2^{nd}$ cycle Tg=106.4° C.

Copolyester G was prepared from DMT with EG, CHDM, and BDS. To a 500 ml round bottom flask equipped with a ground glass head, a stirrer, and a nitrogen inlet was added 98.9 grams (0.51 moles) of dimethyl terephthalate, 41.0 grams (0.662 moles) of ethylene glycol, 42.2 grams (0.293 moles) of 1,4-cyclohexanedimethanol, 22.0 grams (0.065 moles) of BDS, 50 parts per million (ppm) of titanium catalyst in a butanol solution, 40 ppm manganese catalyst in an ethylene glycol solution, and 80 ppm cobalt catalyst in an ethylene glycol solution. The flask was immersed in a Belmont metal bath and was heated for 1.5 hours at 200° C. and 2 hours at 210° C. After this time the theoretical amount of methanol had been collected. Sixty ppm of phosphorus catalyst in an ethylene glycol/butanol solution was added and the temperature increased to 280° C. The pressure in the flask was reduced from atmospheric pressure to 0.3 mm of Hg over 5 minutes. The temperature was maintained at 280° C. and the pressure at 0.3 mm for 50 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Four synthesis runs were prepared and the average analytical results are as follows: I.V.=0.835 dL/g; color=L* 75.52, a* −1.06, b* 4.41; DSC $2^{nd}$ cycle Tg=98.4° C.

Copolyester H was prepared from DMT with EG, CHDM, and BDS. To a 500 ml round bottom flask equipped with a ground glass head, a stirrer, and a nitrogen inlet was added 77.6 grams (0.40 moles) of dimethyl terephthalate, 28.3 grams (0.456 moles) of ethylene glycol, 34.8 grams (0.242 moles) of 1,4-cyclohexanedimethanol, 34.5 grams (0.102 moles) of BDS, 50 parts per million (ppm) of titanium catalyst in a butanol solution, 55 ppm manganese catalyst in an ethylene glycol solution, and 80 ppm cobalt catalyst in an ethylene glycol solution. The flask was immersed in a Belmont metal bath and was heated for 1.5 hours at 200° C. and 2 hours at 210° C. After this time the theoretical amount of methanol had been collected. Sixty ppm of phosphorus catalyst in an ethylene glycol/butanol solution was added and the temperature increased to 280° C. The pressure in the flask was reduced from atmospheric pressure to 0.3 mm of Hg over 5 minutes. The temperature was maintained at 280° C. and the pressure at 0.3 mm for 55 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Three synthesis runs were prepared and the average analytical results are as follows: I.V.=0.710 dL/g; color=L* 78.37, a* −0.94, b* 2.17; DSC $2^{nd}$ cycle Tg=106.8° C.

The resultant compositions and inherent viscosity of these copolyesters are shown in Table 1.

TABLE 1

| Copolyester | CHDM content (mole %) | EG content (mol %) | BDS content (mole %) | ppm Ti | ppm Mn | ppm Co | ppm P | IV |
|---|---|---|---|---|---|---|---|---|
| A | 30 | 55 | 15 | 32 | 46 | 0 | 23 | 0.726 |
| B | 63 | 22 | 15 | 32 | 46 | 0 | 23 | 0.697 |
| C | 52 | 40 | 8 | 50 | 40 | 80 | 60 | 0.835 |
| D | 59 | 33 | 8 | 50 | 40 | 80 | 60 | 0.859 |
| E | 61 | 14 | 25 | 50 | 40 | 80 | 60 | 0.691 |
| F | 66 | 10 | 24 | 50 | 40 | 80 | 60 | 0.576 |
| G | 51 | 36 | 13 | 50 | 40 | 80 | 60 | 0.835 |
| H | 51 | 24 | 25 | 50 | 55 | 80 | 60 | 0.710 |

The copolyesters listed in Table 1 were then blended with bisphenol A polycarbonate and a phosphorous additive. The phosphorous concentrate was prepared by first hydrolyzing Weston 619 buy melting it and soaking it in water, allowing the excess water to evaporate. A powdered version MAKRALON 2608 is then added to the now hydrolyzed molten Weston 619 and mixed until it a homogeneous solution is formed. This material is then extruded in a twin-screw extruder at 280° C. and pelletized. The final phosphorous content in the pellets is 5 wt %. The 75 wt % of each of the copolyesters in Table 1 were blended with 20 wt % bisphenol A polycarbonate and 5 wt % of the phosphorous additive in an APV 19 mm twin screw extruder equipped with moderate mixing screws at 290° C. The blends properties of these blends are summarized in Table 2. Note that two of the immiscible blends which always have two Tg's on the DSC $1^{st}$ cycle, have a second Tg which is numerically unclear from the DSC curve and is therefore not reported. These unclear values are marked as "NR".

TABLE 2

| Example | Copolyester Used | Visual Appearance | DSC 1st cycle Tg ° C. | DSC 2nd cycle Tg ° C. |
|---|---|---|---|---|
| 1 | A | Hazy | 93, 140 | 95, 130 |
| 2 | B | Clear | 106 | 106 |
| 3 | C | Clear | 101 | 101 |
| 4 | D | Clear | 104 | 104 |
| 5 | E | Hazy | 107, 140 | 108, 135 |
| 6 | F | Hazy | 108, NR | 108 |
| 7 | G | Hazy | 101, 136 | 103 |
| 8 | H | Hazy | 80, 135 | 87, NR |

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A polymer composition comprising:
   (A) from 1 to 99 percent by weight at least one polyester (A) comprising:
   (1) diacid residues comprising from about 80 to 100 mole percent diacid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and
   (2) diol residues comprising from about 50 to 65 mole percent 1,4-cyclohexanedimethanol residues, from about 1 to about 49 mole percent of ethylene glycol residues, from about 1 to 35 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and
   (B) from 1 to 99 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent;
   wherein the total weight percent of said polyester(s) (A) and polycarbonate(s) (B) is equal to 100 weight percent; and
   wherein the polyester(s) (A) and polycarbonate(s) (B) are miscible when blended together.

2. A polymer composition according to claim 1 wherein the diacid and diol residues of polyester (A) consist essentially of:
   (1) diacid residues comprising from about 80 to 100 mole percent of terephthalic acid residues and 0 to about 20 mole percent isophthalic acid residues; and
   (2) diol residues comprising from about 55 to 65 mole percent 1,4-cyclohexanedimethanol residues, from about 15 to about 40 mole percent of ethylene glycol residues, from about 5 to 25 mole percent 2,2'-(sulfonylbis(4,1-phenyleneoxy)-bis(ethanol) and from about 0 to 10 mole percent modifying glycol units having from 3 to 16 carbon atoms, wherein the total mole percent of glycol residues is equal to 100 mole percent.

3. A polymer composition according to claim 1 wherein polyester (A) comprises about 90 to 100 mole percent of terephthalic acid residues.

4. A polymer composition according to claim 1 wherein polyester (A) comprises about 55 to 65 mole percent of 1,4-cyclohexanedimethanol.

5. A polymer composition according to claim 4 wherein polyester (A) comprises about 58 to 64 mole percent of 1,4-cyclohexanedimethanol.

6. A polymer composition according to claim 1 wherein polyester (A) comprises about 15 to 40 mole percent of ethylene glycol.

7. A polymer composition according to claim 6 wherein polyester (A) comprises about 20 to 40 mole percent of ethylene glycol.

8. A polymer composition according to claim 1 wherein polyester (A) comprises about 10 to 25 mole percent of 2,2'-(sulfonylbis(4,1-phenyleneoxy)-bis(ethanol).

9. A polymer composition according to claim 8 wherein polyester (A) comprises about 10 to 20 mole percent of 2,2'-(sulfonylbis(4,1-phenyleneoxy)-bis(ethanol).

10. A polymer composition according to claim 9 wherein polyester (A) comprises about 8 to 15 mole percent of 2,2'-(sulfonylbis(4,1-phenyleneoxy)-bis(ethanol).

11. A polymer composition according to claim 1 wherein the modifying diol residue(s) of polyester (A) are selected from the group consisting of 1,2-propanediol, 1,3-propanediol, 1,4-butanediol, 1,5-pentanediol, 1,6-hexanediol, p-xylene glycol, neopentyl glycol, polyethylene glycol and polytetramethylene glycol, and mixtures thereof.

12. A polymer composition according to claim 1 wherein terephthalic acid residues comprise 90 to 100 mole percent of the diacid residues in polyester (A).

13. A polymer composition according to claim 1 wherein terephthalic acid residues comprise 95 to 100 mole percent of the diacid residues in polyester (A).

14. The polymer composition of claim 13 wherein terephthalic acid residues comprise 95 to 99.9 mole percent and isophthalic acid residues comprise 0.1 to 5 mole percent of the diacid residues in polyester (A).

15. A polymer composition according to claim 1 wherein polyester (A) has an inherent viscosity (I.V.) of about 0.3 to 1.2 dL/g as determined at 25° C. using 0.50 gram of polymer per 100 mL of a solvent composed of 60 weight percent phenol and 40 weight percent tetrachloroethane.

16. A polymer composition according to claim 15 wherein polyester (A) has an inherent viscosity (I.V.) of at least 0.5 dL/g as determined at 25° C. using 0.50 gram of polymer per 100 mL of a solvent composed of 60 weight percent phenol and 40 weight percent tetrachloroethane.

17. A polymer composition according to claim 16 wherein polyester (A) has an inherent viscosity (I.V.) of at least 0.7 dL/g as determined at 25° C. using 0.50 gram of polymer per 100 mL of a solvent composed of 60 weight percent phenol and 40 weight percent tetrachloroethane.

18. A polymer composition according to claim 1 wherein polycarbonate (B) has an inherent viscosity (I.V.) of at least 0.3 dL/g as determined at 25° C. using 0.50 gram of polymer per 100 mL of a solvent composed of 60 weight percent phenol and 40 weight percent tetrachloroethane.

19. A polymer composition according to claim 18 wherein polycarbonate (B) has an inherent viscosity (I.V.) of at least 0.5 dL/g as determined at 25° C. using 0.50 gram of polymer per 100 mL of a solvent composed of 60 weight percent phenol and 40 weight percent tetrachloroethane.

20. A polymer composition according to claim 1 wherein the total weight percent of polyester(s) (A) is from about 20 to 99 weight percent and the weight percent of polycarbonate(s) (B) is from about 1 to 80 weight percent.

21. A polymer composition according to claim 20 wherein the total weight percent polyester(s) (A) from about 40 to 90 weight percent and the weight percent of polycarbonate(s) (B) is from about 10 to 60 weight percent.

22. A polymer composition according to claim 21 wherein the total weight percent of polyester(s) (A) is from about 50 to 80 weight percent and the weight percent of polycarbonate(s) (B) is from about 20 to 50 weight percent.

23. A polymer composition according to claim 22 wherein the total weight percent of polyester(s) (A) is from about 60 to 75 weight percent and the weight percent of polycarbonate(s) (B) is from about 25 to 40 weight percent.

24. A polymer composition comprising:
(A) from 20 to 99 percent by weight at least one polyester (A) comprising:
  (1) diacid residues comprising from about 90 to 100 mole percent diaccid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and
  (2) diol residues comprising from about 55 to 65 mole percent 1,4-cyclohexanedimethanol residues, from about 15 to 40 mole percent of ethylene glycol residues, from about 5 to 25 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent;
(B) from 1 to 80 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and
(C) optionally, at least one salt (C) prepared by the reaction of one or more acidic phosphorus-containing compounds with one or more basic organic compounds which contain nitrogen;
  wherein the total weight percent of said polyester(s) (A) and polycarbonate(s) (B) is equal to 100 weight percent; and
  wherein polyester(s) (A) and polycarbonate(s) (B) are miscible when blended together.

25. A polymer composition comprising:
(A) from 40 to 90 percent by weight at least one polyester (A) comprising:
  (1) diacid residues comprising from about 90 to 100 mole percent diacid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and
  (2) diol residues comprising from about 58 to 64 mole percent 1,4-cyclohexanedimethanol residues, from about 20 to 40 mole percent of ethylene glycol residues, from about 10 to 20 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and (B) from 10 to 60 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and (C) optionally, at least one salt (C) prepared by the reaction of one or more acidic phosphorus-containing compounds with one or more basic organic compounds which contain nitrogen;

wherein the total weight percent of said polyester(s) (A) and polycarbonate(s) (B) is equal to 100 weight percent; and wherein polyester(s) (A) and polycarbonate(s) (B) are miscible when blended together.

26. A polymer composition comprising:
(A) from 50 to 80 percent by weight at least one polyester (A) comprising:
  (1) diacid residues comprising from about 90 to 100 mole percent diacid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and
  (2) diol residues comprising from about 58 to 64 mole percent 1,4-cyclohexanedimethanol residues, from about 20 to 40 mole percent of ethylene glycol residues, from about 8 to 15 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and (B) from 20 to 50 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and (C) optionally, at least one salt (C) prepared by the reaction of one or more acidic phosphorus-containing compounds with one or more basic organic compounds which contain nitrogen;

wherein the total weight percent of said polyester(s) (A) and polycarbonate(s) (B) is equal to 100 weight percent; and wherein the polyester(s) (A) and polycarbonate(s) (B) are miscible when blended together.

27. A polymer composition comprising:
(A) from 60 to 75 percent by weight at least one polyester (A) comprising:
  (1) diacid residues comprising from about 90 to 100 mole percent diacid acid residues selected from the group consisting of terephthalic acid residues, isophthalic acid residues, and mixtures thereof; and from about 0 to about 20 mole percent of modifying diacid residues having about 2 to 20 carbon atoms, wherein the total mole percent of diacid residues is equal to 100 mole percent; and
  (2) diol residues comprising from about 58 to 64 mole percent 1,4-cyclohexanedimethanol residues, from about 20 to 40 mole percent of ethylene glycol residues, from about 8 to 15 mole percent 2,2'-(sulfonylbis(4,1-phenyleneoxy)-bis(ethanol) and from about 0 to 10 mole percent modifying diol residues having from 3 to 16 carbon atoms, wherein the total mole percent of diol residues is equal to 100 mole percent; and (B) from 25 to 40 percent by weight of at least one polycarbonate (B) comprising from about 90 to 100 mole percent 4,4'-isopropylidenediphenol and from about 0 to 10 mole percent modifying diol residues having 2 to 16 carbon atoms, wherein the total mole percent of diol residues is equal to 100 mole percent; and (C) optionally, at least one salt (C) prepared by the reaction of one or more acidic phosphorus-containing compounds with one or more basic organic compounds which contain nitrogen;

wherein the total weight percent of said polyester(s) (A) and polycarbonate(s) (B) is equal to 100 weight percent; and wherein the polyester(s) (A) and polycarbonate(s) (B) are miscible when blended together.

28. The polymer composition of claims 1, 24, 25, 26 or 27 wherein the acidic phosphorus-containing compounds of salt (C) are selected from the group of consisting of compounds having the formulas:

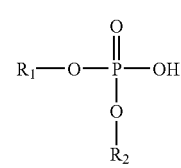

(1)

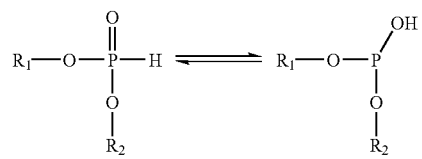

(2)

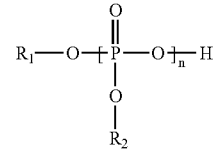

(3)

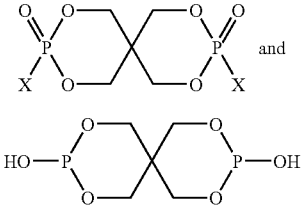

(4)

and (5)

wherein
$R_1$ and $R_2$ are independently selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;
n is 2 to 500; and X is selected from the group consisting of hydrogen and hydroxy;
and wherein the basic organic compounds are selected from the group consisting of compounds having the formulas:
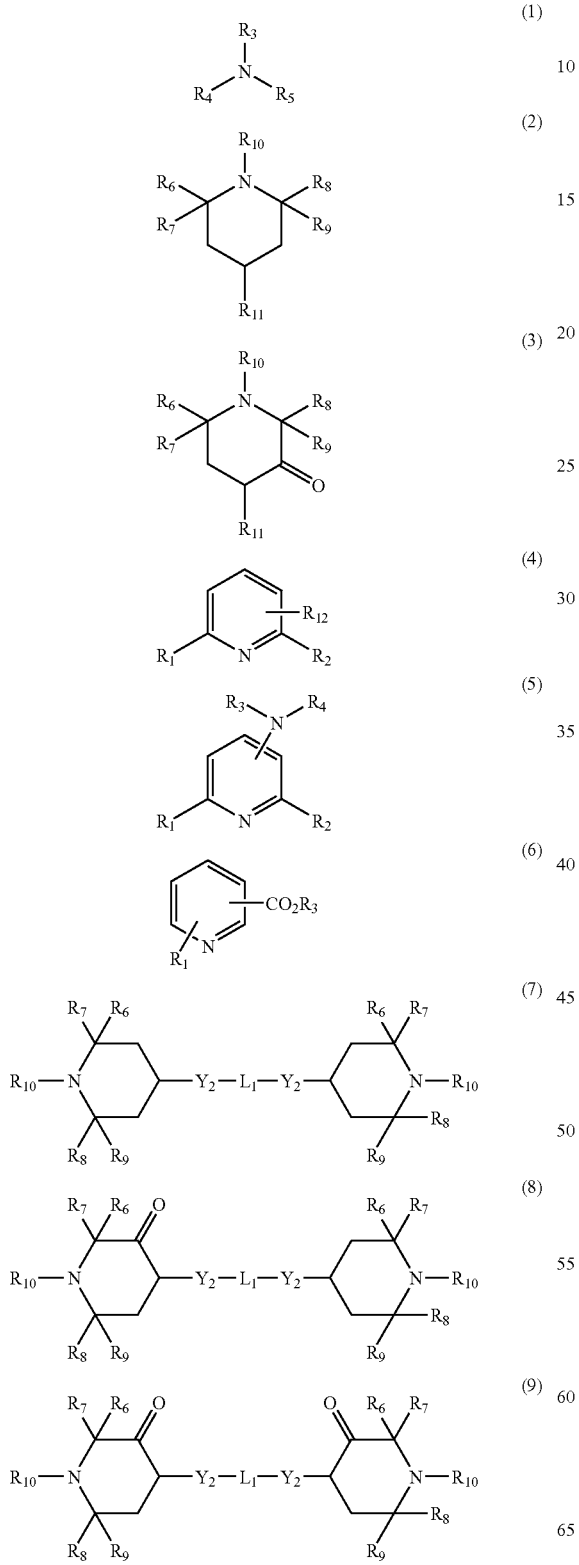
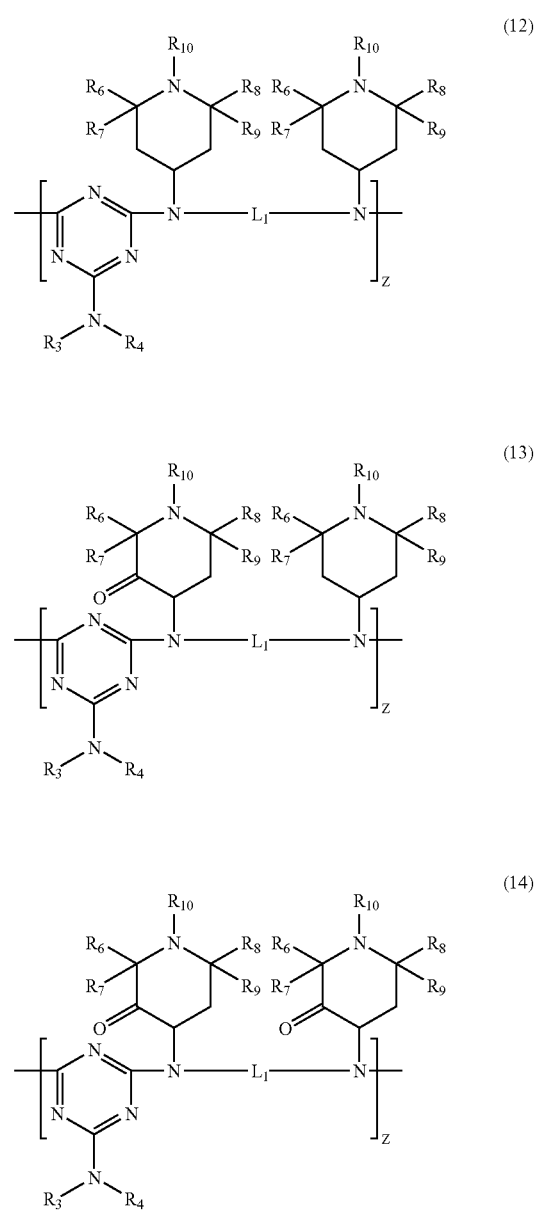

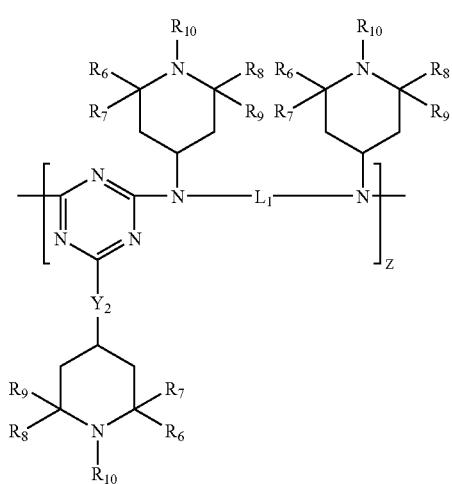 (16)

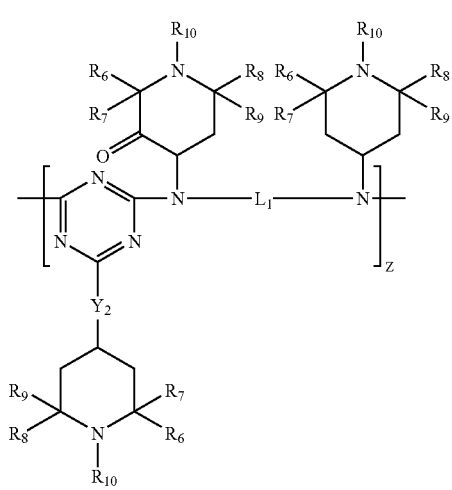 (17)

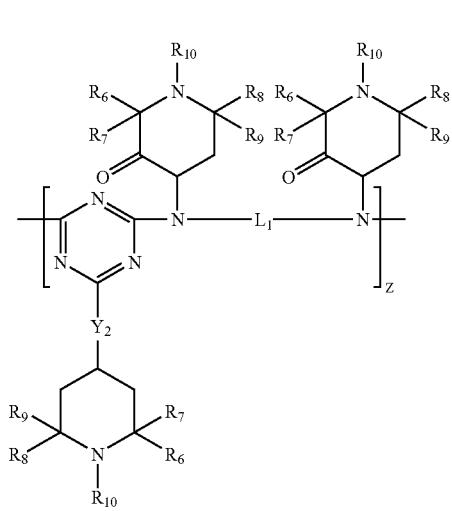 (18)

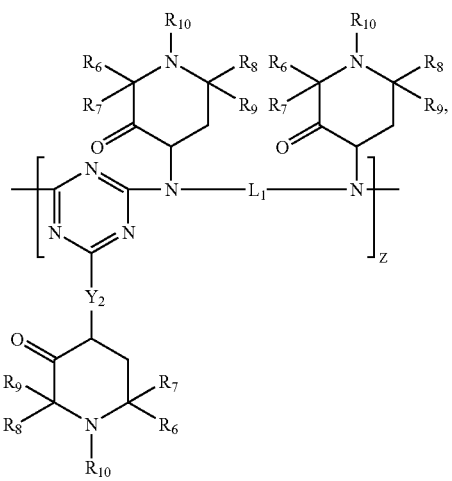 (19)

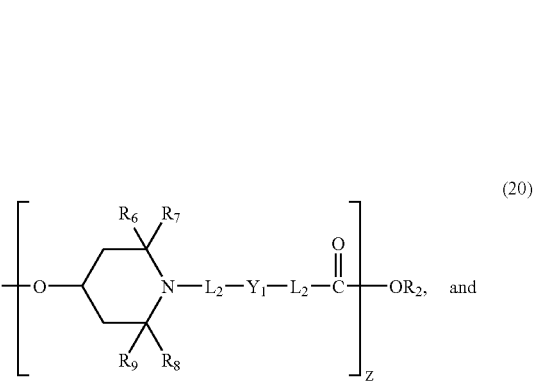 (20)

$$R_{15}-\underset{\underset{R_1}{|}}{N}-(L_2)_{n1}-\underset{\underset{R_{15}'}{|}}{N}-(L_{2'})_{m1}-\underset{\underset{R_{16}}{|}}{N}-(L_{2''})_{p1}-\underset{\underset{R_2}{|}}{N}-R_{16}';$$ (21)

wherein $R_1$ and $R_2$ are independently is selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;

$R_3$, $R_4$, and $R_5$ are independently selected from the group consisting of hydrogen, $C_1$–$C_{22}$-alkyl, substituted $C_1$–$C_{22}$-alkyl, $C_3$–$C_8$-cycloalkyl, and substituted $C_3$–$C_8$-cycloalkyl wherein at least one of $R_3$, $R_4$, and $R_5$ is a substituent other than hydrogen; $R_3$ and $R_4$ or $R_4$ and $R_5$ collectively represent a divalent group forming a ring with the nitrogen atom to which they are attached;

$R_6$, $R_7$, $R_8$, and $R_9$ are independently selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;

$R_{10}$ is selected from the group consisting of hydrogen, —$OR_6$, $C_1$–$C_{22}$-alkyl, substituted $C_1$–$C_{22}$-alkyl, $C_3$–$C_8$-cycloalkyl, and substituted $C_3$–$C_8$-cycloalkyl;

$R_{11}$ is hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl, —$Y_1$—$R_3$ or a succinimido group having the formula

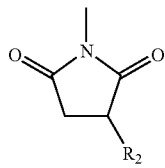

$R_{12}$ is selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl and may be located at the 2, 3 or 4 positions on the aromatic ring;

the —$N(R_3)(R_4)$ group may be located at the 2, 3 or 4 positions on the pyridine ring of nitrogen compound (5);

the —$CO_2R_3$ and $R_1$ groups may be located at any of the 2, 3, 4, 5, or 6 positions of the pyridine ring of nitrogen compound (6);

$L_1$ is a divalent linking group selected from the group consisting of $C_2$–$C_{22}$-alkylene, —$(CH_2CH_2$—$Y_1)_{1\text{-}3}$—$CH_2CH_2$—, $C_3$–$C_8$-cycloalkylene, arylene, and —CO—$L_2$—OC—;

$L_2$, $L_2'$ and $L_2''$ are independently selected from $C_1$–$C_{22}$-alkylene, arylene, —$(CH_2CH_2$—$Y_1)_{1\text{-}3}$—$CH_2CH_2$— and $C_3$–$C_8$-cycloalkylene;

$Y_1$ is selected from —OC(O)—, —NHC(O)—, —O—, —S—, —$N(R_1)$—;

$Y_2$ is selected from —O— or —$N(R_1)$—;

$R_{13}$ and $R_{14}$ are independently selected from —O—$R_2$, and —$N(R_2)_2$;

Z is a positive integer of up to about 20, preferably up to about 6;

m1, n1 and p1 are independently selected from 1 to about 12;

$R_{15}$, $R_{15}'$, $R_{16}$ are $R_{16}'$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl, and radical A wherein radical A is selected from the following structures:

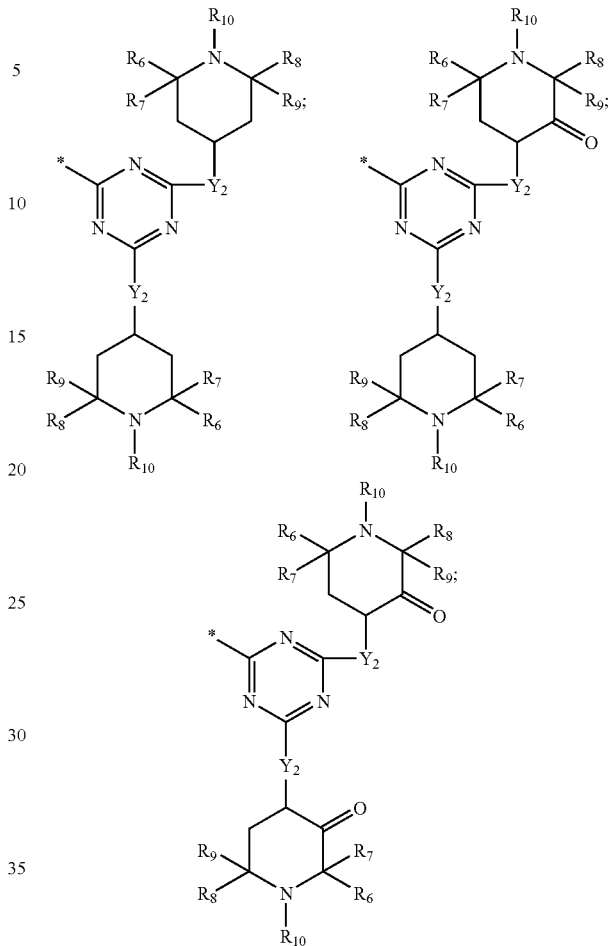

wherein * of the Radical A structures designates the position of attachment; and the ratio of the number of phosphorus atoms in the acidic phosphorus-containing compound to the number of basic nitrogen atoms in the basic organic compound is about 0.05 to about 2.

29. The polymer composition of claim 28 wherein salt (C) is present in said polymer composition in the amount of about 0.01 to about 0.25 weight percent based on the total weight of the composition of at least one salt prepared by the reaction of phosphorous acid, with one or more basic organic compounds which contain nitrogen and have one of the following formulas:

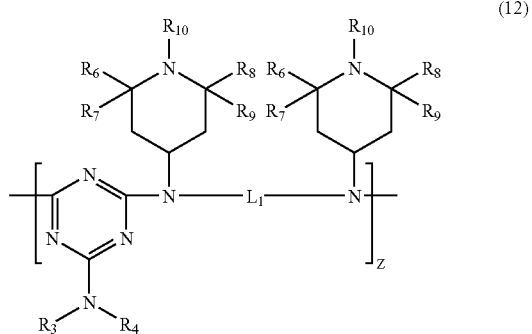

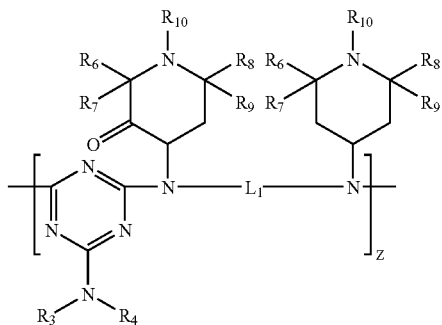
(13)
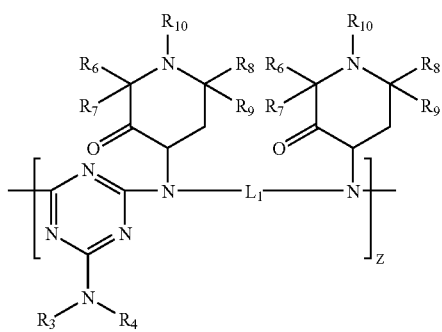
(14)
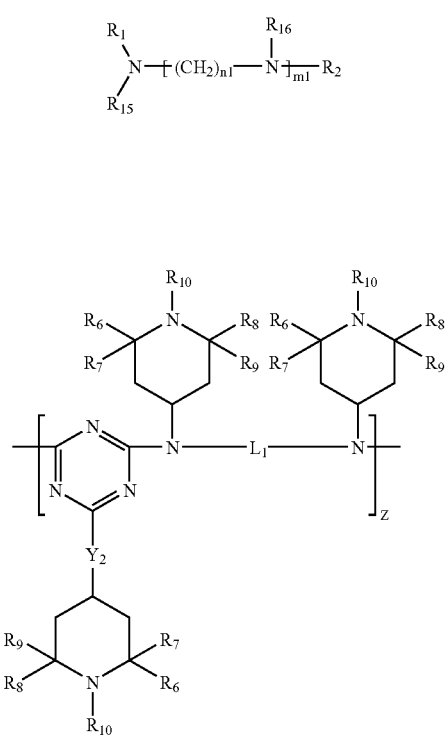
(15)
(16)
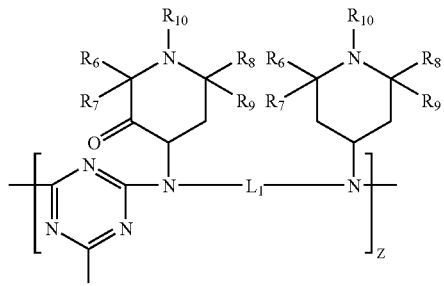
(17)
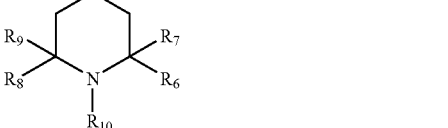
(18)
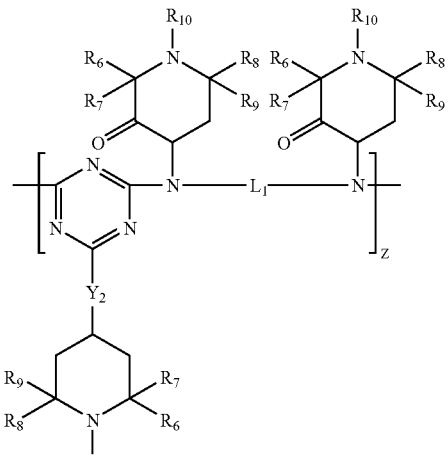
(19)
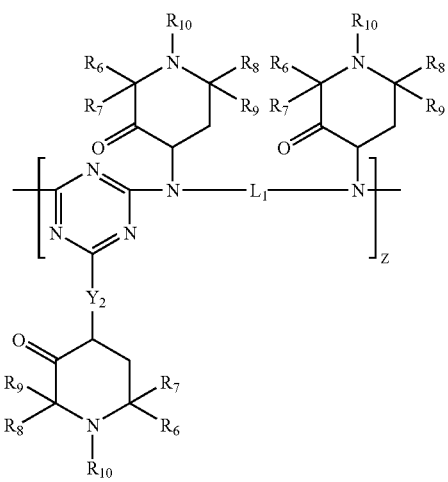
(20)
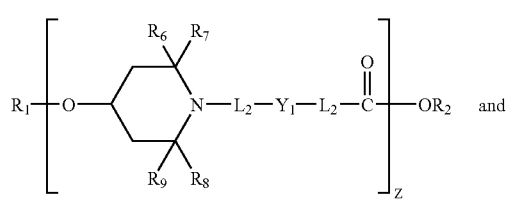 and -continued

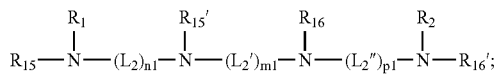
(21)

wherein $R_1$ and $R_2$ are independently selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;

$R_3$, $R_4$, and $R_5$ are independently selected from the group consisting of hydrogen, $C_1$–$C_{22}$-alkyl, substituted $C_1$–$C_{22}$-alkyl, $C_3$–$C_8$-cycloalkyl, and substituted $C_3$–$C_8$-cycloalkyl wherein at least one of $R_3$, $R_4$, and $R_5$ is a substituent other than hydrogen; $R_3$ and $R_4$ or $R_4$ and $R_5$ collectively represent a divalent group forming a ring with the nitrogen atom to which they are attached;

$R_6$, $R_7$, $R_8$, and $R_9$ are independently selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;

$R_{10}$ is selected from the group consisting of hydrogen, —$OR_6$, $C_1$–$C_{22}$-alkyl, substituted $C_1$–$C_{22}$-alkyl, $C_3$–$C_8$-cycloalkyl, and substituted $C_3$–$C_8$-cycloalkyl;

$R_{11}$ is hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl, —$Y_1$—$R_3$ or a succinimido group having the formula

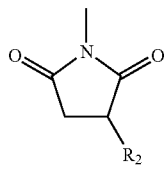

$R_{12}$ is selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl and may be located at the 2, 3 or 4 positions on the aromatic ring;

the —$N(R_3)(R_4)$ group may be located at the 2, 3 or 4 positions on the pyridine ring of nitrogen compound (5);

the —$CO_2R_3$ and $R_1$ groups may be located at any of the 2, 3, 4, 5, or 6 positions of the pyridine ring of nitrogen compound (6);

$L_1$ is a divalent linking group selected from the group consisting of $C_2$–$C_{22}$-alkylene, —$(CH_2CH_2$—$Y_1)_{1-3}$—$CH_2CH_2$—, $C_3$–$C_8$-cycloalkylene, arylene, and —CO—$L_2$—OC—;

$L_2$, $L_2'$ and $L_2''$ are independently selected from $C_1$–$C_{22}$-alkylene, arylene, —$(CH_2CH_2$—$Y_1)_{1-3}$—$CH_2CH_2$— and $C_3$–$C_8$-cycloalkylene;

$Y_1$ is selected from —OC(O)—, —NHC(O)—, —O—, —S—, —$N(R_1)$—;

$Y_2$ is selected from —O— or —$N(R_1)$—;

$R_{13}$ and $R_{14}$ are independently selected from —O—$R_2$, and —$N(R_2)_2$;

Z is a positive integer of up to about 20, preferably up to about 6;

m1, n1 and p1 are independently selected from 1 to about 12;

$R_{15}$, $R_{15}'$, $R_{16}$ are $R_{16}'$ are independently selected from hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, aryl, and radical A wherein radical A is selected from the following structures:

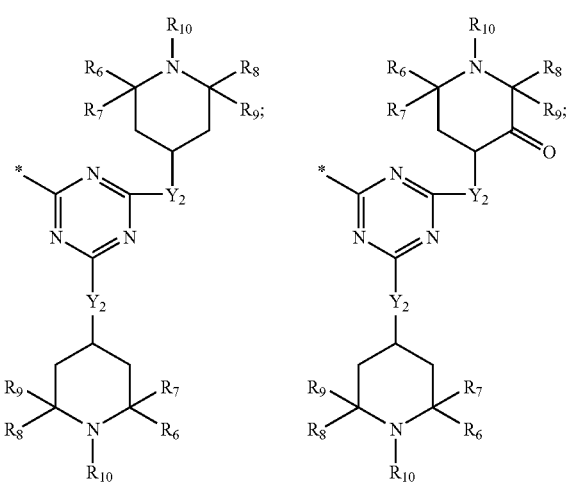

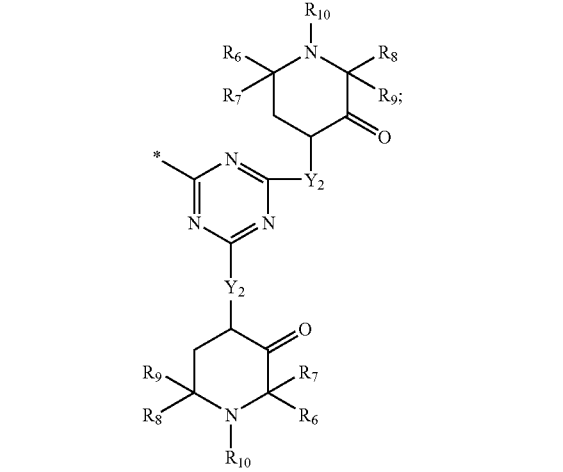

wherein * of the Radical A structures designates the position of attachment; and the ratio of the number of phosphorus atoms in the acidic phosphorus-containing compound to the number of basic nitrogen atoms in the basic organic compound is about 0.05 to about 2.

30. The polymer composition of claim 29 wherein salt (C) is present in said polymer composition in the amount of about 0.01 to about 0.25 weight percent based on the total weight of the composition of at least one salt prepared by the reaction of phosphorous acid, with a basic organic compound having the formula:

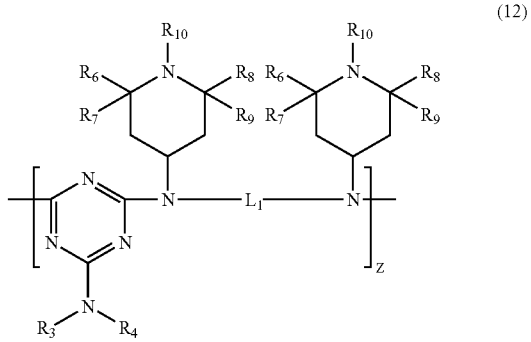

(12)

wherein
- $R_3$ and $R_4$ are independently selected from the group consisting of hydrogen, $C_1$–$C_{22}$-alkyl, substituted $C_1$–$C_{22}$-alkyl, $C_3$–$C_8$-cycloalkyl, and substituted $C_3$–$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;
- $R_6$, $R_7$, $R_8$, and $R_9$ are independently selected from the group consisting of hydrogen, $C_1$–$C_{22}$-alkyl, substituted $C_1$–$C_{22}$-alkyl, $C_3$–$C_8$-cycloalkyl, substituted $C_3$–$C_8$-cycloalkyl, heteroaryl, and aryl;
- $R_{10}$ is selected from the group consisting of hydrogen and $C_1$–$C_{22}$-alkyl;
- $L_1$ is a divalent linking group selected from the group consisting of $C_2$–$C_{22}$-alkylene, —(CH$_2$CH$_2$—Y$_1$)$_{1-3}$—CH$_2$CH$_2$—, $C_3$–$C_8$-cycloalkylene, arylene, and —CO—L$_2$—OC—;
- $L_2$ is selected from $C_1$–$C_{22}$-alkylene, arylene, —(CH$_2$CH$_2$—Y$_1$)$_{1-3}$—CH$_2$CH$_2$- and $C_3$–$C_8$-cycloalkylene;
- $Y_1$ is selected from the group consisting of —OC(O)—, —NHC(O)—, —O—, —S—, and —N(R$_1$)—; and
- Z is a positive integer of up to about 6.

31. The polymer composition according to claim 30 wherein salt (C) comprises about 0.05 to about 0.15 weight percent based on the total weight of the composition and the ratio of the number of phosphorus atoms in the acidic phosphorus-containing compound to number of basic nitrogen atoms in the basic organic compound is about 0.25 to about 1.1.

32. A polymer composition according to claims 24, 25, 26 or 27 wherein polyester (A) has an inherent viscosity (I.V.) of about 0.3 to 1.2 dL/g as determined at 25° C. using 0.50 gram of polymer per 100 mL of a solvent composed of 60 weight percent phenol and 40 weight percent tetrachloroethane.

33. A polymer composition according to claims 24, 25, 26, 27 wherein polycarbonate (B) has an inherent viscosity (I.V.) of at least 0.3 dL/g as determined at 25° C. using 0.50 gram of polymer per 100 mL of a solvent composed of 60 weight percent phenol and 40 weight percent tetrachloroethane.

34. A polymer composition according to claim 33 wherein polycarbonate (B) has an inherent viscosity (I.V.) of at least 0.5 dL/g as determined at 25° C. using 0.50 gram of polymer per 100 mL of a solvent composed of 60 weight percent phenol and 40 weight percent tetrachloroethane.

35. The polymer composition of claims 1, 24, 25, 26, or 27 wherein polyester (A) polycarbonate (B) comprise one or more branching agents comprising about 0.01 to about 10.0 weight percent, based on the total weight of the polymer composition.

36. The polymer composition of claim 35 containing one or more branching agents comprising about 0.05 to about 5 weight percent, based on the total weight of the polymer composition.

37. The polymer composition of claim 36 wherein said branching agents comprise about 0.01 to about 1 weight percent (wt %), based on the total weight of said polymer, of one or more residues of monomers having 3 or more carboxyl substituents, hydroxyl substituents, or a combination thereof.

38. The polymer composition of claim 37 wherein said branching agents comprise about 0.1 to about 0.7 mole percent of one or more residues of trimellitic anhydride, pyromellitic dianhydride, glycerol, sorbitol, 1,2,6-hexanetriol, pentaerythritol, trimethylolethane, or trimesic acid.

39. The polymer composition of claims 1, 24, 25, 26, or 27 further comprising one or more plasticizers.

40. The polymer composition of claims 1, 24, 25, 26, or 27 further comprising about 5 to about 40 weight %, based on the total weight of said polymer composition, of a flame retardant.

41. The polymer composition of claim 40 comprising one or flame retardants selected from the group consisting of phosphorous based compounds.

42. The polymer composition of claim 41 comprising one or more monoesters, diesters, or triesters of phosphoric acid.

43. A method of producing the polymer composition of claims 1, 24, 25, 26, or 27 which comprises the steps of:
a) blending polyester(s) (A) and polycarbonate(s) (B);
(b) before, during or after the blending of polyester(s) (A) and polycarbonate(s) (B), melting the polymers to form after the blending and melting, a melt blend; and
(d) cooling the melt blend to form a clear blend composition.

44. A method of producing the polymer composition of claims 1, 24, 25, 26, or 27 which comprises the steps of:
(a) blending polyester(s) (A), polycarbonate(s) (B), and, optionally, salt (C);
(b) melting the blend of (a) to form after the blending and melting, a melt blend; and
(c) cooling the melt blend to form a clear blend composition.

45. A process for the manufacture of film or sheet comprising the steps of extruding or calendering a polymer composition according to claims 1, 24, 25, 26, or 27.

46. A film or sheet comprising a polymer composition according to claims 1, 24, 25, 26, or 27.

47. A film or sheet according to claim 46 wherein said film or sheet was produced by extrusion or calendering.

48. A film or sheet according to claim 46 having at least 2 layers.

49. A film or sheet according to claim 46 wherein polyester(s) (A) and polycarbonate(s) (B) are in separate layers.

50. A shaped article comprising a polymer composition according to claims 1, 24, 25, 26, or 27.

51. A shaped article according to claim 50 wherein said article was produced by injection molding or extrusion blow molding.

52. The shaped article of claim 50 which is a fiber, sheet, film, tube, bottle or profile.

* * * * *